US009474249B2

United States Patent
Lipscomb

(10) Patent No.: US 9,474,249 B2
(45) Date of Patent: Oct. 25, 2016

(54) RECIRCULATING PET FOUNTAIN

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 167 days.

(21) Appl. No.: 13/841,039

(22) Filed: Mar. 15, 2013

(65) Prior Publication Data

US 2013/0199454 A1 Aug. 8, 2013

Related U.S. Application Data

(63) Continuation-in-part of application No. 13/823,298, filed as application No. PCT/US2012/054029 on Sep. 6, 2012.

(60) Provisional application No. 61/531,613, filed on Sep. 6, 2011.

(51) Int. Cl.
   *A01K 7/00* (2006.01)
   *A01K 7/02* (2006.01)

(52) U.S. Cl.
   CPC .. *A01K 7/00* (2013.01); *A01K 7/02* (2013.01)

(58) Field of Classification Search
   CPC .......... A01K 39/02; A01K 7/02; A01K 7/00; A01K 45/002; A01K 5/0216; E03B 9/20; B05B 17/08; B05B 17/085
   See application file for complete search history.

(56) References Cited

U.S. PATENT DOCUMENTS

| | | | |
|---|---|---|---|
| 2,123,892 A * | 7/1938 | Grady | 239/23 |
| 3,595,478 A | 7/1971 | Power | |
| 4,281,794 A | 8/1981 | Dimino | |
| 4,836,142 A | 6/1989 | Duback | |
| 5,167,368 A | 12/1992 | Nash | |
| 5,799,609 A | 9/1998 | Burns et al. | |
| 5,842,437 A | 12/1998 | Burns | |
| 6,530,530 B1 * | 3/2003 | Peterson | 239/17 |
| 6,684,813 B1 * | 2/2004 | Lemon | 119/69.5 |
| 8,117,991 B1 * | 2/2012 | Civitillo | 119/73 |
| 8,448,603 B2 * | 5/2013 | Northrop et al. | 119/61.54 |
| 2005/0166853 A1 | 8/2005 | Plante | |
| 2008/0190374 A1 * | 8/2008 | Farris | 119/74 |

FOREIGN PATENT DOCUMENTS

| | | |
|---|---|---|
| CN | 2925082 | 7/2007 |
| SU | 377136 | 5/1973 |
| WO | 2010138799 | 12/2010 |

* cited by examiner

*Primary Examiner* — Kathleen Alker
(74) *Attorney, Agent, or Firm* — Boyle Fredrickson S.C.

(57) ABSTRACT

A recirculating pet fountain with an upper drinking bowl in water flow recirculation with a lower drinking bowl that includes a step upon which an animal, e.g., cat, can perch while drinking. The upper bowl is suspended above the lower bowl by an arm that provides a graspable handle and conduit through which water is conveyed by a pump upwardly to the upper bowl where the water flows downwardly back into the lower bowl. The fountain preferably includes a water-conveying bridge along which water from the upper bowl flows downwardly toward the lower bowl. The bridge can be an open concave channel along which water drinkable by the perched animal downwardly flows. The lower bowl can have a tubular overflow extending upwardly from water in the lower bowl from which water received from the upper bowl, including via the bridge, overflows into the lower bowl during recirculating fountain operation.

28 Claims, 10 Drawing Sheets

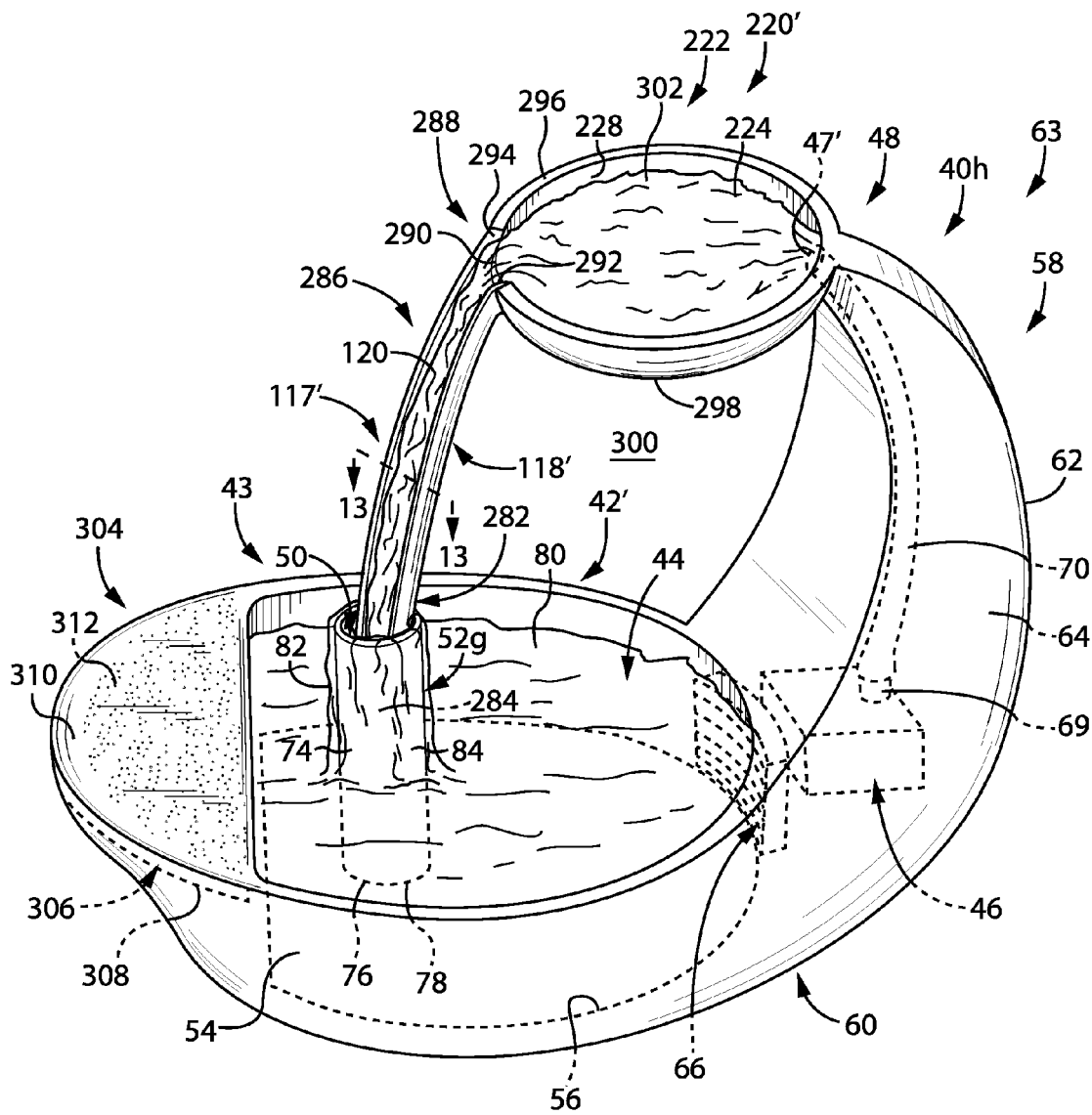
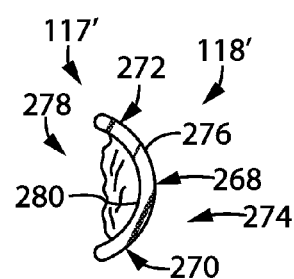
FIG. 12
FIG. 13

RECIRCULATING PET FOUNTAIN

CROSS REFERENCE TO RELATED APPLICATION(S)

This application is a continuation-in-part of co-pending U.S. patent application Ser. No. 13/823,298, filed Mar. 14, 2013, which is a U.S. National Stage of International Application No. PCT/US2012/054029, filed Sep. 6, 2012, which claims priority under 35 U.S.C. §119(e) to U.S. Provisional Patent Application No. 61/531,613, filed Sep. 6, 2011, each of which is expressly incorporated by reference herein.

FIELD

The present invention relates to a pet watering device and more particularly to a recirculating pet fountain.

BACKGROUND

There are many pet fountains being commercially sold today throughout the United States and the world. Many of these pet fountains have an open compartment containing water that defines a bowl or basin from which water can be drunk by an animal, such as a pet, like a dog or cat. A pump, such as a submersible aquarium pump, can be used to recirculate water helping to aerate the water to help keep the water fresh. Such a pump can be used to draw water from the open compartment and deliver the water to another location, such as another water-holding compartment that can be located rearwardly of and/or above the open compartment. Water discharged by the pump flows back into the open compartment where it can be drank by an animal or drawn into the pump to be re-circulated again.

One known fountain has a front compartment formed in a container that is open and holds water that an animal, typically a cat, can drink. The fountain includes a water reservoir that seats in a rear compartment formed in the container that has a top covered by a lid and an outlet ramp from which water freely falls onto a "shark fin" that has an angled surface that disperses the water falling onto it. Unfortunately, the freely falling water can and quite often still does splash when it hits the "shark fin" which can and quite often does make a cat hesitant to drink from the fountain.

What is needed is an improved pet fountain.

SUMMARY

The present invention is directed to recirculating pet fountain used as an animal waterer or watering device that includes a basin from which water is pumped using a pump to a fountain discharge where the water expelled from the discharge returns to the basin. The discharge is located at a height higher than a water line of water in the basin and can overlie part of the basin. Water flowing from the discharge can be received in an overflow tube, a water-conveying bridge that directs the flowing water toward the basin, and can be conveyed by the bridge into the tube or directly into the basin. The bridge can be configured so at least some of the water flowing toward the basin clings via surface tension to its underside.

Where equipped with an overflow tube, the tube has a sidewall that can be of endless construction defining a mouth through which water expelled from the discharge enters the tube. The overflow tube extends outwardly above a water line of water in the fountain basin with the mouth of the overflow tube also disposed above the water line. Water from the discharge is received in the tube filling up the tube until water overflows from the tube into the basin. Such an overflow tube can be elongate, generally cylindrical and inclined or curved in a desired direction relative to either or both the discharge and an adjacent portion of the fountain basin sidewall.

The overflow tube can include one or more discharge ports formed in the sidewall that allow water to overflow from the tube below an outer edge of the tube sidewall that defines the mouth. Where an overflow tube includes one or more discharge ports, they are disposed below the mouth such that water filling up the tube overflows out the ports before overflowing from the mouth of the tube. This can keep the level of water in the overflow tube lower than the mouth such that water from the discharge entering the mouth of the tube impinges or impacts water already in the tube below the mouth. Keeping the water level in the tube below the level of the mouth while water overflows from the tube helps minimize and preferably substantially completely prevents splashing of water into the basin because to the extent any splashing occurs, it occurs within the tube.

Each discharge port is an opening formed in the overflow tube sidewall that extends completely through the sidewall enabling water within the tube to overflow out the port down the outside of the tube and into water in the basin. One or more of the discharge ports can be a slot that can elongate and extend generally longitudinally or generally transversely relative to a longitudinal extent of the tube. Such a slot can have opposite ends disposed below the overflow tube mouth and can be configured as a cutout formed in the mouth-defining outer edge of the tube.

One or more of the discharge ports can include a flow director that can be formed in an outer surface of the tube sidewall that directs the flow of water overflowing from the tube out a discharge slot in a desired direction along the outside of the tube sidewall. A preferred flow director is formed of edges of a discharge port that converge in the desired direction the flow of water exiting the port is to be directed. One preferred discharge port configured with a flow director is teardrop shaped having edges converging to a point directing flow of water overflowing out the port in the elongated extent of the port.

An overflow tube can include a plurality of discharge ports spaced different distances from the mouth with one overflow tube embodiment having a plurality of sets of discharge ports with each set of ports spaced different distances from the mouth. In one embodiment, each set of ports has a plurality of discharge ports arranged in a row which can extend generally transversely relative to the longitudinal extent of the tube and which can be spaced apart from one another about the circumference or periphery of the tube.

A flow adjuster can be provided that is movable between a plurality of positions that stops water overflow through at least one discharge port when disposed in one position and allows water overflow through the at least one discharge port when disposed in another position. One flow adjuster is a collar telescopically carried by the overflow tube that is movable axially relative to the tube between a first position where the collar stops water overflow through the at least one discharge port and a second position where the collar allows water overflow through the at least one discharge port.

Where the overflow tube has a plurality of discharge ports spaced apart different distances from the mouth, the flow adjuster can be movable relative to the tube between one position where water overflow through one discharge port is stopped by the flow adjuster allowing water overflow through another discharge port and another position water overflow through the one discharge port is allowed and water overflow through the another discharge port is stopped by the flow adjuster. Where the flow adjuster is a collar, the collar can be moved axially along the tube between one position where the collar covers and block water overflow through the one discharge port allowing water overflow through the another discharge port and another position allowing water overflow through the one discharge port and covering and blocking water flow through the another discharge port. Such a flow adjuster can be axially movable relative to the tube beyond the mouth of tube extending the effective length of the tube.

An overflow tube can be length adjustable so as to selectively increase or decrease the length of the tube. In one embodiment, length can be effectively increased using a collar carried by the tube that is axially displaceable relative to the tube. In another embodiment, the overflow tube can be part of an overflow tube assembly having an upper tube extending outwardly above the water line that is engaged with a tube anchor submerged below the water line in manner that permits the upper tube to be extended or retracted relative to the water line. In one such overflow tube assembly, the upper tube is telescopically engaged with the tube anchor in a manner where rotation of the upper tube in one direction extends the upper tube farther outwardly from the water line and rotation of the upper tube in an opposite direction retracts the upper tube.

The overflow tube can be inclined, curved, or otherwise oriented with part of an outer surface of the sidewall defining the tube facing toward and disposed adjacent part of a sidewall defining the fountain basin enabling overflowing water to flow down part of the outer tube sidewall surface near the basin. Such an overflow tube can have one or more discharge ports with one or more discharge ports formed in the part of the outer tube sidewall surface facing toward the adjacent part of the basin sidewall.

The overflow tube can be inclined, curved, or otherwise oriented with part of an outer surface of the sidewall defining the tube facing toward and disposed adjacent water in the basin enabling overflowing water to cling to the outside of the tube sidewall via surface tension and flow down part of the outer tube sidewall surface facing toward the water. Such an overflow tube can have one or more discharge ports with one or more discharge ports formed in the part of the outer tube sidewall surface facing toward water in the basin.

Part of the overflow tube submerged below the water line can include an intake in fluid flow communication with the pump. The intake can be formed of a perforate intake grate in the tube sidewall in fluid-flow communication with water in the basin enabling water to flow through the intake grate into the tube before flowing through an intake conduit to the pump.

The fountain can include a water-conveying bridge that conveys water expelled from the fountain discharge toward the basin. One water-conveying bridge is configured so water clings via surface tension to its underside and flows toward the basin. Such a water-conveying bridge can include a flow splitter that splits the flow of water exiting from the discharge into one stream that flows along one side of the bridge and another stream that flows along an opposite side of the bridge. A preferred flow splitter includes a flow diverter that diverts some water exiting from the discharge into a lower water stream that clings to the bridge underside and flows toward the basin allowing the remaining water to flow in an upper water stream along the top of the bridge.

One water-conveying bridge embodiment is a water-transport channel that is generally U-shaped having a bed disposed between upwardly extending channel sides along which the upper water stream flows toward the basin. Where the bridge includes a flow splitter, the flow splitter can be formed of a flow diverting tongue formed in part of the channel, such as its bed, that extends along a flow diverting aperture through which water exiting the discharge splits and flows along the underside. The tongue can be configured with an offset that spaces a generally planar flow directing surface relative to the bridge so water exiting the discharge is diverted along the underside. Such an offset can space at least part of the flow directing surface below the underside so water being diverted will flow through the flow diverting aperture toward the underside. Such an offset can space the tongue above the bed so at least some water exiting the discharge flows below the tongue along the underside.

Such water-conveying bridge embodiments can deliver water to an overflow tube or directly into the basin. Such water-conveying bridge embodiments can extend from the discharge all the way to the mouth of an overflow tube and can be engaged with the tube if desired. Such water-conveying bridge embodiments can also extend from the discharge all the way to the basin.

Various other features, advantages and objects of the present invention will be made apparent from the following detailed description and the drawings.

DRAWING DESCRIPTION

Preferred exemplary embodiments of the invention are illustrated in the accompanying drawings in which like reference numerals represent like parts throughout and in which:

FIG. 12 is a perspective view of another preferred recirculating pet fountain constructed with another preferred embodiment of an overflow tube; and FIG. 13 is a cross sectional view of a bridge of the recirculating pet fountain of FIG. 12.

Figure 1:
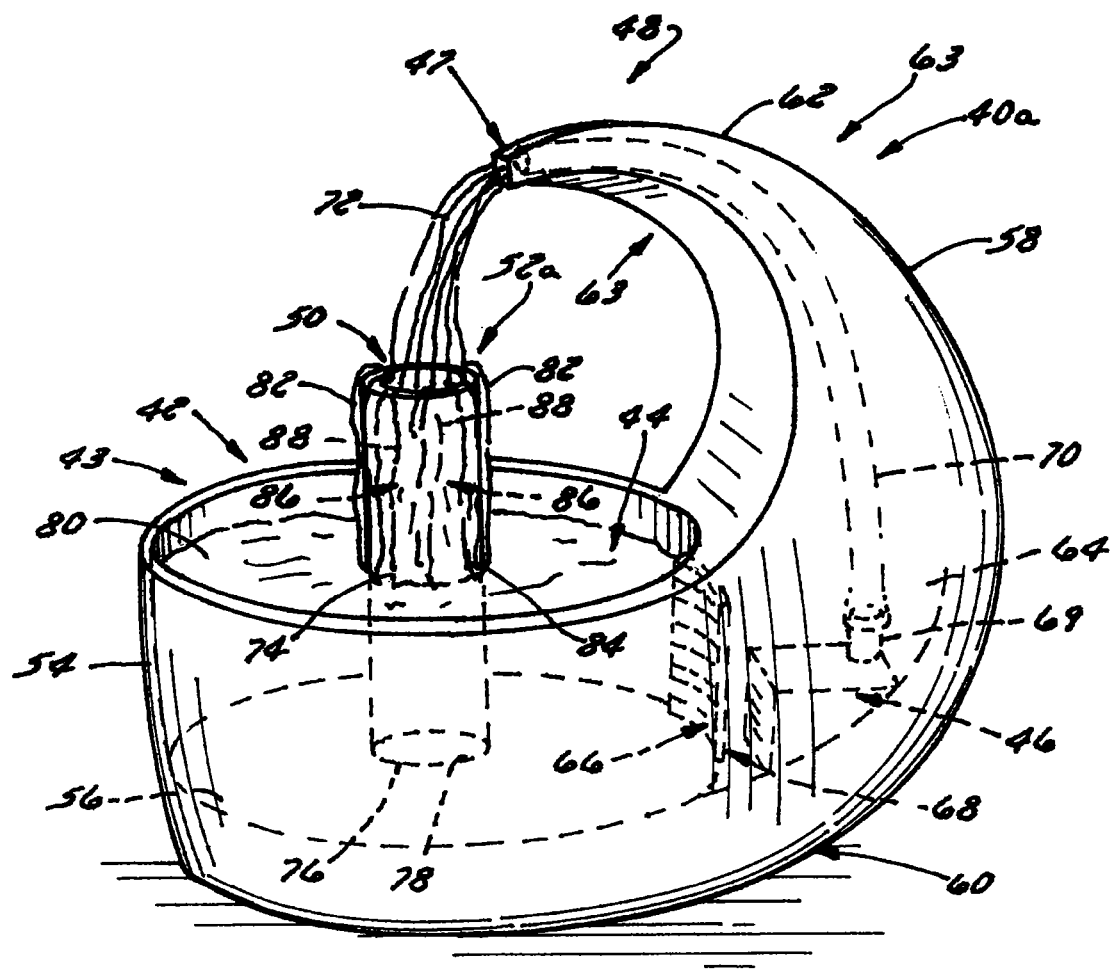
FIG. 1 is a perspective view of a first embodiment of a recirculating pet fountain equipped with a first embodiment of an overflow tube.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIG. 1 illustrates a preferred embodiment of a recirculating pet fountain 40a constructed in accordance with the present invention that has an open basin 42 that holds water 44 that is pumped upwardly by a pump 46 through an outlet or discharge 47 of a fountain head 48 into a mouth 50 of a tube 52a until water overflows from the tube 52a back into the basin 42. Such an overflow tube 52a allows water discharged from the fountain head 48 above the basin 42 to pour into the tube 52a and at least partially fill up the tube 52a until it reaches a level where it overflows from the tube 52a back into the basin 42 in a manner that minimizes splashing helping to prevent or reduce noise that could distract or otherwise frighten away a thirsty pet, such as a thirsty cat.

The fountain basin 42 is defined by a sidewall 54 that extends upwardly from a bottom wall 56 defining a drinking bowl 43 from which an animal, such as a cat, can drink. The fountain head 48 is carried by an upright 58 that extends upwardly from a base 60 of the fountain 40a. The fountain head discharge 47 is positioned over and above the basin 42 so that a water stream 72 expelled from the discharge 47 flows into the mouth 50 of the overflow tube 52a. In the embodiment shown in FIG. 1, the upright 58 is formed of an arm 62 that can be hollow, e.g., tubular, which can be curved, angled, or otherwise oriented to position the discharge 47 so a water stream 72 expelled from the discharge 47 flows into the tube 52a where it overflows into the basin 42. In FIG. 1, the water stream 72 free falls from the discharge 47 into the mouth 50 of tube 52a in a manner where splashing is minimized and preferably substantially completely prevented.

Where equipped with an arm 62, the arm 62 can be tapered so as to be narrower at or adjacent the fountain head 48, such as at or adjacent the discharge 47, than at or adjacent the base 60. The arm 62 can have a generally rectangular cross section, such as depicted in FIG. 1, or can have a different cross section, such as a circular or oval cross section, if desired. The arm 62 can be curved in a manner that defines a handle 63, such as depicted in FIG. 1, which can be grasped to pick up and/or otherwise maneuver or move the fountain 40a.

The upright 58 can be formed of a component separate from the fountain base 60, such as one molded of plastic, which is attached to the base 60 during fountain assembly. Where separate, the upright 58 can be configured to engage part of a pumping chamber 64 formed in the base 60. Where the upright 58 is separate from the base 60, the upright 58 and base 60 can be configured to snap together, e.g., be of snap-fit construction, during assembly.

An intake 66, e.g., perforate intake grate, can be disposed in the sidewall 54 of the basin 42, such as by being integrally formed in the basin sidewall 54, to enable the pump 46 to draw water 44 from the basin 42 and expel the water 44 out the discharge 47. The intake 66 is shown in FIG. 1 formed in part of the basin sidewall 54 located adjacent the pump 46. The pump 46, which can be a submersible aquarium pump or the like, is received in a pumping chamber 64 formed in the fountain base 60. The pump 46 has a pump discharge outlet 69 in fluid-flow communication with a fluid-conveying conduit 70, such as an elongate, flexible tube, which extends from the pump 46 to or adjacent the fountain discharge 47. Such a fluid-conveying conduit 70 can also be an integrally molded portion of the arm 62, upright 58 and/or base 60 that can seat in fluid registry with the pump discharge outlet 69 during fountain assembly.

A filter 68 can be disposed upstream of the pump 46 such as by being received in part of the chamber 64 downstream of the intake 66 and upstream of the pump 46. Although not shown, the filter 68 can be slidably received in a pair of spaced apart channels or slots formed in the chamber 64, e.g., such as in opposite sidewalls of the chamber 64. Such a filter 68 can be replaceable. Although not shown, the pump 46 and filter 68 can be part of a module that includes a housing enclosing the pump 46 and filter 68.

With continued reference to FIG. 1, the overflow tube 52a has an open end defining a mouth 50 that receives a stream 72 of water that free falls into the tube 52a when expelled from the fountain discharge 47 at the end of the upright 58. The tube 52a is defined by an endless sidewall 74 that extends upwardly from the bottom 56 of the basin 42. As is shown in FIG. 1, the tube 52a can be disposed inwardly of the basin sidewall 54 so as to be completely surrounded by water 44 in the basin 42 during fountain operation.

The end 76 of the overflow tube 52a opposite its mouth 50 is anchored to the fountain base 60, such as by being attached to the bottom 56 of the basin 42. In one embodiment, the tube 52a is releasably anchored in place to the basin 42 enabling removal of the tube 52a such as for being washed in a dishwasher or the like. The anchor end 76 of the tube 52a can be configured for snap-fit or frictional engagement with the base 60. For example, the tube 52a can be a component separate from the base 60 that has its anchor end 76 configured to be inserted into a receptacle 78, e.g., socket, formed in the basin bottom 56 and twisted to lock, e.g., snap or otherwise engage, the tube 52a generally uprightly in place anchoring the tube 52a to the base 60.

The overflow tube 52a can be generally cylindrical and is elongate having its mouth 50 positioned above a water level 80 of water 44 in the basin 42 so that the water 72 expelled from the fountain discharge 47 flows into the tube 52a before overflowing from the tube 52a into the basin 42. The flow rate of water 72 discharged from the discharge 47 along with the size of the mouth 50 of the overflow tube 52a are selected to accept all of the water 72 being discharged in a manner that substantially prevents splashing while allowing water overflow 82 from the tube 52a in a manner where surface tension causes the water overflow 82 to adhere to an outer surface 84 of the tube sidewall 74 until it reaches water 44 in the basin 42. The tube 52a is located within the basin 42 close enough to an adjacent portion of the basin sidewall 54 so an animal, such as a cat, seeking to drink water can drink either drink water overflow 82 from the tube 52a or can drink water 44 in the basin 42.

During fountain operation, water stream 72 free falls from the fountain discharge 47 into the mouth 50 of the overflow tube 52a until water overflow 82 overflows from the tube 52a into water 44 in the basin 42 below. Water overflow 82 causes water to flow down the sidewall 74 of the tube 52a in a smoothly flowing sheet or layer, e.g., laminar flow, which clings or adheres by surface tension to the outer surface 84 of the sidewall 74 enabling water overflow 82 to be drunk by a pet, such as a cat, as it flows down the outside of the tube sidewall 74.

Although shown in phantom in FIG. 1, the overflow tube 52a can include one or more overflow guides 86 configured to allow water that has filled up the tube 52a to overflow from the tube 52a at a height below that of the mouth 50 of the tube 52a. As is also shown in phantom in FIG. 1, the tube 52a has a plurality of circumferentially spaced apart overflow guide slots 88 that can be elongate and which extend generally in an axial or longitudinal direction relative to the tube 52a. Although the overflow guide slots 88 shown in phantom in FIG. 1 are generally straight, one or more of the slots 88 can be curved, e.g., generally helical or spiral, can be angled, e.g., generally L-shaped, and can be in fluid-flow communication with a generally axially or downwardly extending flow-guiding channel (not shown) formed in the outer surface 84 of the tube sidewall 74.

Each such overflow guide slot 88 extends completely through the tube sidewall 74 having at least one end disposed below the mouth 50 of the overflow tube 52a causing water received in the tube mouth 50 from the discharge 47 to fill up the interior of the tube 52a until it reaches the slot 88. Once water in the tube 52a filling up the tube 52a reaches the slot 88, water overflows out the slot 88 down the outer surface 84 of the tube sidewall 74 into the basin 42 below. As a result, water from the discharge 47 filling up the tube 52a never completely fills up the tube 52a such that any water falling from the discharge 47 into the tube 52a impact water in the tube 52a below the mouth 50. This advantageously minimizes if not substantially completely prevents splashing.

Figures 2A, 2B:
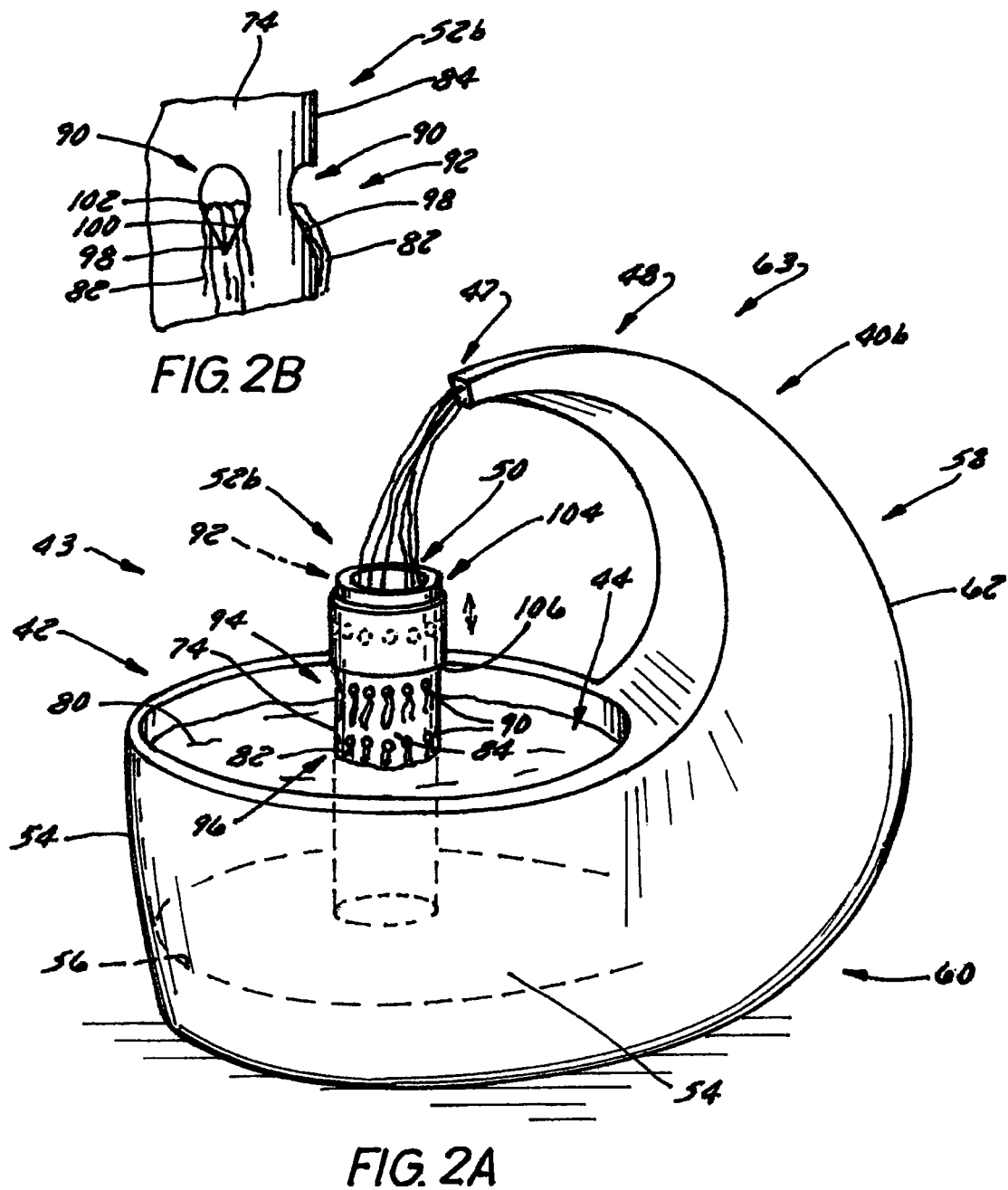
FIG. 2A is a perspective view of a second embodiment of a recirculating pet fountain equipped with a second preferred embodiment of an overflow tube.
FIG. 2B is a fragmentary elevation view of a portion of the overflow tube of FIG. 2A.

FIG. 2A illustrates another preferred embodiment of an overflow pet fountain 40b that includes an overflow tube 52b extending upwardly out of a drinking basin 42 that holds water 44 that is drunk by a cat or other pet during use or operation that includes one or more discharge ports 90 through which water overflows from the tube 52b. The fountain 40b shown in FIG. 2A also includes a pump (not shown in FIG. 2A) that communicates water 44 from the basin 42 to the fountain head 48 in a manner that is the same as or similar to that of the fountain 40a of FIG. 1. As is shown in FIG. 2A, the tube 52b is elongate, hollow and defined by a sidewall 74 that can be of endless construction which has a plurality of discharge ports 90 out which water in the tube 52b flows once water in the tube 52b reaches at least the level of the ports 90. As is best depicted in FIG. 2B, each port 90 is a through-bore or hole that extends completely through the tube sidewall 74 in fluid flow communication with a water holding cavity within the tube 52b defined by tube sidewall 74.

In the fountain embodiment shown in FIG. 2A, the discharge ports 90 can be arranged in a row and circumferentially spaced apart about the periphery of the overflow tube 52b. In the overflow tube embodiment shown in FIG. 2A, there is a plurality of pairs, i.e., at least three, of axially spaced apart rows 92, 94 and 96 of circumferentially spaced apart discharge ports 90 with at least one of the rows 92, 94 and/or 96 of ports 90 being disposed above the water line 80 of water 44 in the fountain basin 42. The number of discharge ports 90 along with the surface area of each port 90 are selected so that water expelled from the fountain discharge 47 into the mouth 50 of the overflow tube 52b will overflow out ports 90 in a substantially laminar flow that adheres to the outer surface 84 of the tube sidewall 74 as it flows downwardly into water 44 in the basin 42.

Positioning each row 92, 94 and 96 of ports 90 below the overflow tube mouth 50 also advantageously ensures water overflowing from the tube 52b will do so below the mouth 50. This permits water expelled from the discharge 47 to free fall from a significant height above the tube mouth 50 before impacting water already inside the tube 52a thereby minimizing splashing. Splashing is minimized because, to the extent any splashing takes place on impact of water expelled from the discharge 47 against water already in the tube 52b, the splashing is confined within the tube 52b and does not extend outwardly beyond the tube 52b.

Each one of the discharge ports 90 is integrally formed, preferably molded, into the overflow tube sidewall 74 when the overflow tube 52b is made. Each port 90 can be generally circular or oblong, e.g. oval, if desired. In a preferred discharge port configuration shown in FIG. 2B, one or more of the discharge ports 90 can be configured with a sloping or inclined flow guide 98 that helps encourage laminar flow of water 82 overflowing out the ports 90 down the tube sidewall 74. Where configured with a flow guide 98, the flow guide 98 can also help guide the flow of water overflowing from the port 90 in a desired direction along the outer surface 84 of the tube sidewall 74.

In the preferred discharge port configuration shown in FIG. 2B, one or more of the ports 90 can be oblong with its longitudinal axis generally parallel to or generally aligned with the lengthwise direction of the tube 52b. Each port 90 is generally oblong and can be generally teardrop shaped as shown in FIG. 2B with the flow guide 98 being defined by converging side edges 100 and 102 of the teardrop shaped port 90.

To help provide control over at least some of the flow of water 82 overflowing out at least some of the discharge ports 90, the overflow tube 52b can include a flow adjuster 104 that can be a collar 106 of annular or tubular construction that can be moved to block one or more discharge ports 90 or one or more rows 92, 94, and/or 96 of discharge ports 90 as desired. Such a flow adjuster 104 can be axially displaceable by being telescoped over the tube 52b and be slidable relative to the tube sidewall 74 to cover and block flow of water out one or more of the ports 90 and/or one or more rows 92, 94, and/or 96 of ports 90 as desired. If desired, such a flow adjuster 104 can be configured to axially move relative to the tube 52b along the tube sidewall 74 to block ports 90 and/or rows 92, 94 and/or 96 of ports 90 via a twisting motion. For example, the flow adjuster 104 can be configured with one or more radially inwardly extending tabs or fingers (not shown) received in a corresponding curved, e.g. helical or spiral, slot or channel (not shown)

formed in the outer surface 84 of the tube sidewall 74 that axially guides flow adjuster movement, such as up or down along the tube 52b, as the flow adjuster 104 is twisted or rotated relative to the tube 52b.

The flow adjuster 104 shown in FIG. 2A is a tubular collar 106, e.g., tube, which is telescopically received on the overflow tube 52b. The flow adjuster 104 is shown in FIG. 2A disposed in a first position where it covers a top row 92 of discharge ports 90 (shown in phantom in FIG. 2A) blocking the top row 92 of ports 90 preventing water in the tube 52b from overflowing out the top row 92 of ports 90. When it is desired to permit water to overflow out the top row 92 of ports 90, the flow adjuster tube 106 is lowered relative to the tube 52b to a second position below the first position to uncover and unblock the top row 92 of ports 90. Moving the flow adjuster tube 106 to such a second position, positions it closer to the water line 80 where the flow adjuster tube 106 can and preferably does cover and block at least one of the other rows 94 and/or 96 of discharge ports 90. Where it is desired to unblock all of the discharge ports 90, the flow adjuster tube 106 can be slid or otherwise moved downwardly along the overflow tube 52b until it is disposed below the bottom-most row 96 of ports 90.

The flow adjuster tube 106 can also be moved relative to the overflow tube 52b to extend it upwardly beyond the mouth 50 of the overflow tube 52b to effectively extend the length of the tube 52b by disposing the upper end (and mouth) of the flow adjuster tube 106 closer to the fountain discharge 47. The flow adjuster tube 106 can be raised or lowered relative to the overflow tube 52b using routine testing and experimentation by a fountain user to reduce and substantially prevent splashing for a wide range of volumetric flow rates of water 72 expelled out the discharge 47.

In a method of operation, the flow adjuster tube 106 can be configured to block a plurality of rows 92, 94 and/or 96 of ports 90 of an overflow tube 52a so as to allow one row of ports 90 to remain open while blocking one or more of the other remaining rows of ports 90. Such a flow adjuster tube 106 can be manipulated by a fountain user to open at least one row 92, 94 and/or 96 of ports 90 relative to the water line 80 of water 44 in the basin 42 so as to cause the overflow tube 52b to overflow water 82 out ports 90 higher than the water line 80 of water 44 disposed in the basin 42. This in turn lowers the level of water inside the overflow tube 52b sufficiently below that of its mouth 50 preventing splashing when water 72 expelled from discharge 47 falls into the tube 52b.

In one preferred method implementation, the flow adjuster tube 106 can be adjusted to cause overflow from ports 90 or a row, e.g., row(s) 92 and/or 94, of ports 90 high enough above the water line 80 to permit a cat to drink from the water 82 flowing down the outside of the overflow tube 52b. For example, if it is desired for the top row 92 of ports 90 to be uncovered, since the top row 92 of ports 90 is spaced well above the water line 80, the flow adjuster tube 106 is moved downwardly along the overflow tube 52b to unblock the top row 92 of ports 90. This allows water to overflow from the overflow tube 52b out the top row 92 of ports 90 and flow downwardly along the outside of the overflow tube sidewall 74 into water 44 in the basin 42.

This also permits the flow adjuster tube 106 to be positioned in a manner that adjusts flow of water overflowing out the ports 90 in response to changes in the flow rate of water 72 expelled out the fountain discharge 47. In this regard, where the flow rate being expelled from the discharge 47 into the overflow tube 52b is relatively low, the flow adjuster tube 106 can be positioned along the overflow tube 52b to open as few as one or two discharge ports 90 or as little as a single row, e.g., 92, 94 and/or 96, of ports 90 in order to ensure that a desired amount of water 82 overflows from the overflow tube 52b out the open discharge ports 90 and along the outer surface 84 of the tube sidewall 74.

Conversely, where the flow rate flowing out the fountain discharge 47 into the overflow tube 52b is relatively great, the flow adjuster tube 106 can be positioned along the tube 52b to open more ports 90. In this regard, the flow adjuster tube 106 can be moved along overflow tube 52b so it is disposed within the basin 42 and completely covered by water 44 in the basin 42 unblocking substantially all of the ports 90. In another preferred method implementation, the flow adjuster tube 106 can be moved to a position along the overflow tube 52b where at least part of the flow adjuster tube 106 is disposed above the water line 80 so that a plurality of rows, e.g., rows 92 and 94, of ports 90 is open allowing water to overflow out the open ports 90.

Figure 3:
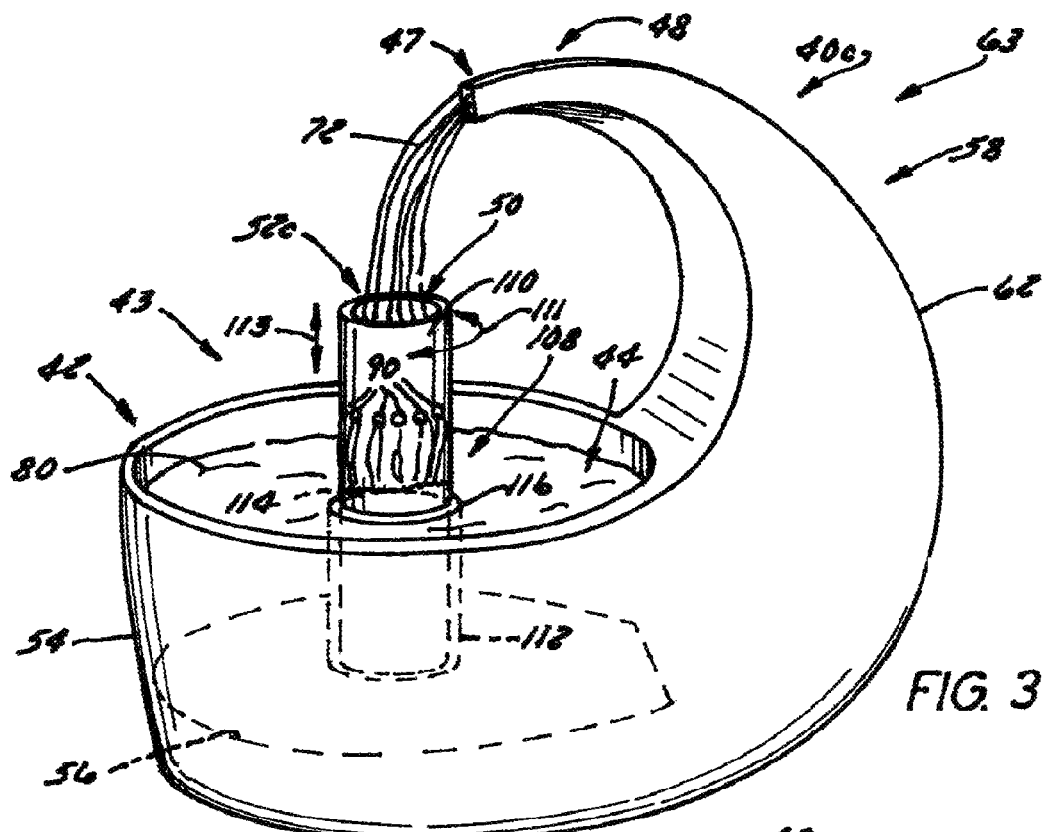
FIG. 3 is a perspective view of a third embodiment of a recirculating pet fountain equipped with a third preferred embodiment of an overflow tube.

FIG. 3 illustrates another preferred overflow fountain embodiment 40c where the overflow tube 52c is part of an overflow tube assembly 108 where tube 52c is defined by an upper overflow tube 110 that seats in a lower overflow anchor tube 112 that is carried by the fountain base 60 that can extend upwardly from the bottom 56 of the fountain basin 42 as shown. The lower tube 112 can be anchored to the basin bottom 56 in a manner that allows removal and reattachment of the tube 112, enabling cleaning of the overflow tube assembly 108 in a dishwasher or the like.

Such an overflow tube assembly 108 can be both height adjustable and flow adjustable. If desired, such an overflow tube assembly, e.g. overflow tube assembly 108, can be height adjustable and can be height adjustable without being flow adjustable. If desired, such an overflow tube assembly, e.g. overflow tube assembly 108, constructed in accordance with the present invention can be configured to be flow adjustable without being height adjustable.

With continued reference to FIG. 3, the upper overflow tube 110 is telescopically coupled to the lower overflow anchor tube 112 in a manner that permits relative movement therebetween. In a preferred embodiment, the upper tube 110 is telescopically received in the lower tube 112 and engaged in a manner such that twisting of the upper tube 110 in either direction, such as indicated by bidirectional arrow 111, relative to the lower tube 112 changes the length of the overall overflow tube assembly 108 in a corresponding longitudinal direction indicated by bidirectional arrow 113. In this regard, as depicted in FIG. 3, twisting of the upper tube 110 in one direction moves the mouth 50 of the upper tube 110 closer to the fountain discharge 47, lengthening the overflow tube assembly 108, and twisting of the upper tube 110 in the opposite direction moves the mouth 50 of the upper tube 110 farther away from the discharge 47, shortening the overflow tube assembly 108.

Where twisting or turning one tube 110 relative to the other tube 112 is done to change overall overflow tube length, one of the tubes 110 is configured to engage the other one of the tubes 112 in a manner that enables relative rotary, e.g., twisting or turning, movement to do so. For example, although not shown in the drawings, one of the tubes 110 or 112 can be configured with inwardly extending tabs or fingers received in corresponding slots or channels formed in the other one of the tubes 112 or 110 (or vice versa).

As is also shown in FIG. 3, the upper tube 110 has a width or diameter that is smaller than the width or diameter of the lower tube 112. This enables the upper tube 110 to be telescopically received in the lower tube 112, such as by being inserted into the lower tube 112 during fountain assembly. If desired, the upper tube 110 can be constructed to have a width or diameter that is larger than the width or diameter of the lower tube 112 enabling the upper tube 110 to be telescoped over the lower tube 112.

Where it is desired to limit how much water needs to be expelled from the fountain discharge 47 into the mouth 50 of the overflow tube assembly 108 until overflow occurs, the overflow tube assembly 108 can include a wall or baffle 114 of imperforate construction disposed between its mouth 50 and end opposite mouth 50 that reduces the volume of water the overflow tube assembly 108 can hold inside it. Such an imperforate wall or baffle 114 extends generally transversely relative to the water stream 72 entering the overflow tube mouth 50 and is disposed within the overflow tube assembly 108 between its mouth 50 and the basin bottom 56. Such an imperforate overflow water holding volume limiting wall or baffle 114 can be formed as part of the upper tube 110, such as an end wall or bottom of tube 110, or can be formed as part of the lower tube 112, such as a top wall of tube 112.

Figure 4:
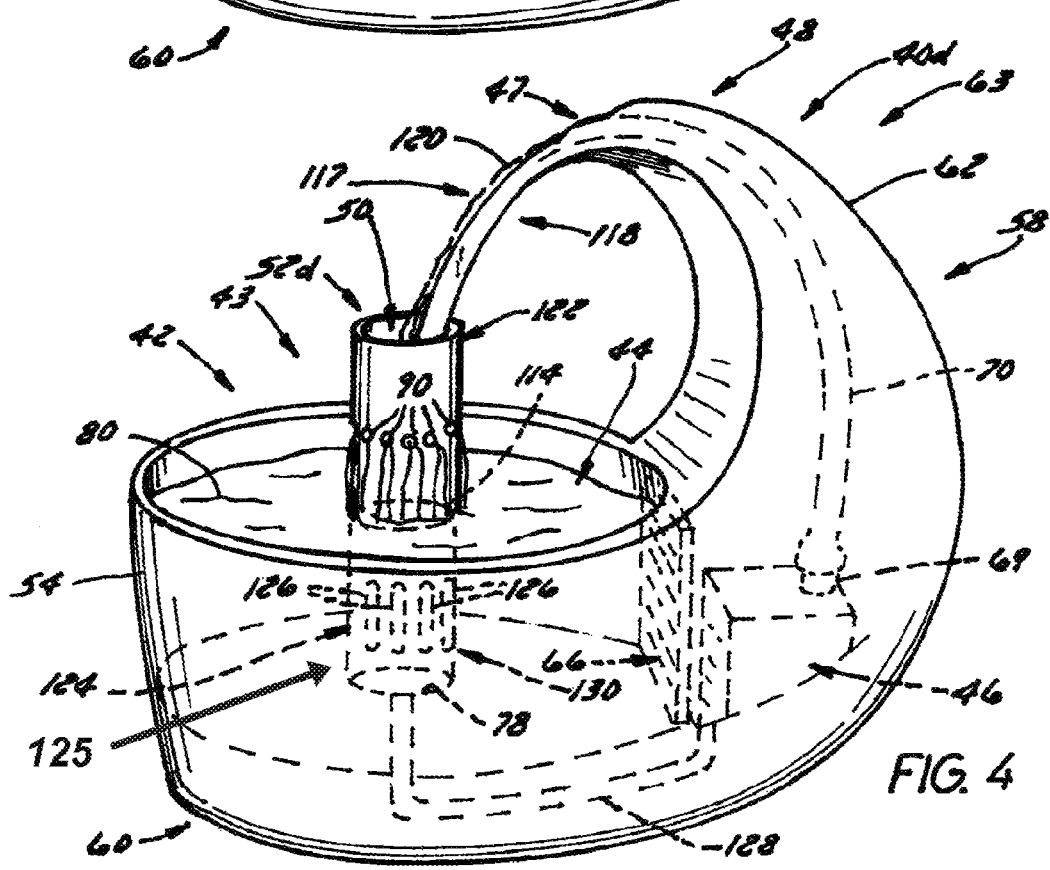
FIG. 4 is a perspective view of a fourth embodiment of a recirculating pet fountain equipped with a fourth preferred embodiment of an overflow tube.

In the preferred overflow tube assembly 108 shown in FIG. 4, the imperforate wall or baffle 114 is disposed within the upper tube 110 between the mouth 50 and basin bottom 56 limiting the water holding volume within the upper tube 110 to less than the total volume inside the entire assembly 108. Where the overflow tube is of one-piece and unitary construction, like overflow tubes 52*a* and 52*b*, such an overflow tube volume limiting wall or baffle 114 can be disposed within the tube 52*a* and/or 52*b* between the mouth 50 of the tube and the end 76 opposite the mouth 50.

Where the overflow tube is an assembly composed of multiple components, such as the overflow tube assembly 108 shown in FIG. 3, the overflow tube volume limiting baffle or wall 114 can be an integrally formed part of the upper overflow tube 110 or can be an integrally formed part of the lower overflow tube 112. Where the overflow tube volume limiting wall or baffle 114 is part of the lower overflow tube 112, relative movement between the upper and lower tubes 110 and 112 can cause the overflow cavity volume within the upper tube 110 to correspondingly increase or decrease.

Depending upon where the overflow tube volume limiting wall or baffle 114 is located relative to discharge ports 90 formed in the upper overflow tube 110, relative movement between the tubes 110 and 112 can position the wall or baffle 114 above or below ports 90 thereby controlling overflow out the ports 90 such as by either obstructing flow through them or opening them. For example, where the wall or baffle 114 shown in FIG. 3 remains stationary relative to the single row of ports 90 and the upper tube 110 when the upper tube 110 is moved relative to the lower tube 112, movement of the ports 90 to a position below the wall or baffle 114 will prevent water from flowing out the ports 90 effectively blocking them. While the wall or baffle 114 is shown in FIG. 3 disposed at or adjacent a top edge or outer end 116 of the lower tube 112, the wall or baffle 114 can be positioned adjacent and below the row of discharge ports 90 in the upper tube 110 so that shortening the length of the overflow tube assembly 108 will prevent flow out the discharge ports 90. Where there is no other discharge port 90 located above the wall or baffle 114, doing so will cause water to overflow from the mouth 50 of the upper tube 110 as all ports 90 will have been effectively blocked.

FIG. 4 illustrates another preferred embodiment of the overflow fountain 40*d* having a fountain discharge 47 in fluid-flow communication with a water-conveying bridge 117 that conveys a water stream 120 from the discharge 47 toward water 44 in the fountain basin 42. The bridge 117 extends from the discharge 47 conveying a water stream 120 from the discharge 47 along the bridge 117 toward the basin 42 in a manner that permits an animal, such as a cat, to drink from the water stream 120 while it flows along the bridge 117.

In the fountain embodiment shown in FIG. 4, the bridge 117 is elongate, arched and extends from the discharge 47 to an overflow tube 52*d* where water flows from the bridge 117 into the mouth 50 of the tube 52*d*. As is also shown in FIG. 4, the end of the bridge 117 disposed in fluid-flow communication with the overflow tube mouth 50 preferably has a width no greater than the width or diameter of the mouth 50. While the width of the opposite end of the bridge 117 that is disposed in fluid-flow communication with the discharge 47 can be wider than the discharge 47, it preferably has a width no greater than the width of the discharge 47 as also shown in FIG. 4.

The bridge 117 is a generally U-shaped water transport channel 118 that extends downwardly from the discharge 47 to the overflow tube 52*d* allowing a water stream 120 to relatively smoothly flow down the channel 118 in a manner that allows a cat to drink from the stream 120 before entering the mouth 50 of the tube 52*d*. The channel 118 can be formed as a separate component that snaps onto the fountain head 48 and snaps onto part of the overflow tube 52*d*. If desired, the channel 118 can be integrally formed as part of either the fountain head 48 or the tube 52*d*.

Where separate from the channel 118, the overflow tube 52*d* can be elongate, tubular, of one-piece, unitary, and substantially homogeneous construction, such as by being formed, e.g. plastic injection molded, of plastic or another suitable material. Part of the mouth 50 of the tube 52*d* can be configured to mate or otherwise register with part of an end of the channel 118. The tube 52*d* can be a single elongate tube as depicted in FIG. 4 having a plurality of discharge ports 90 disposed above a water line 80 of water 44 in the basin 42 with the plurality of discharge ports 90 being arranged in a row if desired. In this regard, the row of ports 90 formed in the tube 52*d* shown in FIG. 4 is spaced apart about the entire circumference or periphery of the tube 52*d* and can be equidistantly spaced apart from one another if desired. The tube 52*d* can be configured with an overflow tube volume limiting wall or baffle 114 that can be integrally formed as part of the tube 52*d* or can be a separate component that can be inserted through the mouth 50 of the tube 52*d* inside the tube 52*d*.

If desired, the overflow tube volume limiting wall or baffle 114 can be a divider that divides the overflow tube 52*d* into an upper overflow tube section 122 and a lower intake tube section 124 having a perforate intake 125 formed of intake grate apertures 126 formed in the tube sidewall 74 in fluid flow communication with an intake conduit 128 underlying the basin bottom 56 that is in fluid flow communication with the pump 46. Where the basin 42 is carried by or formed by the fountain base 60, the intake conduit 128 can be disposed within the base 60 as is also depicted in FIG. 4.

As with other overflow tube embodiments discussed herein, the overflow tube 52*d* can be configured to snap into the fountain base 60, such as by being configured to snap into a recess or receptacle 78 formed in the bottom wall 56 of the basin 42. Other types of arrangements are contemplated as being within the scope of the present invention to enable attachment of the overflow tube 52*d* to part of the fountain 40*d*, typically the bottom 56 of the fountain basin 42. Such an attachment arrangement preferably enables overflow tube removal to facilitate fountain disassembly for cleaning, such as by being washed in a dishwasher. As such, substantially all of the components of each one of the fountain embodiments discussed herein are preferably of dishwasher safe construction.

Where an overflow tube 52*d* is configured to include a perforate intake 125, the intake apertures 126 can be elongate slots arranged to form an intake grate 130 integrally formed of a bottom part 124 of the overflow tube 52*d* that is submerged below the water line 80 of water 44 in the basin 42. The intake grate 130 can be annular and can be formed of axially or longitudinally extending slots 126 circumferentially spaced apart about substantially the entire circumference of the overflow tube 52*d*. As is shown in FIG. 4, each intake aperture 126 has at least a substantial portion, i.e., more than 50%, of its open water conveying surface area disposed below the water level 80 of water 44 in the basin 42. If desired, the width of each intake aperture 126 can vary from being relatively narrow at or adjacent a top end of the aperture 126 to being wider at or adjacent a bottom end of the aperture 126 to thereby prevent debris floating on top of the water, e.g. at or about water level 80, from being drawn into the intake apertures 126 during pump operation.

In the preferred but exemplary fountain embodiment shown in FIG. 4, the fountain 40*d* is configured with a plurality of intakes 66 and 125 with one of the intakes 66 in fluid flow communication with the pump 46 being formed in part of the basin sidewall 54 disposed adjacent the pump 46 and another one of the intakes 125 formed in a bottom portion 124 of the overflow tube 52*d* in fluid flow communication with the pump 46 via an intake fluid conveying conduit 128 disposed in the base 60, e.g., formed in the basin bottom wall 56, of the fountain 40*d*. Although not shown in FIG. 4, a filter can be disposed upstream of the pump 46 and downstream from one or both of the intakes 66 and 125 of the fountain 40*d*. Such a filter can be substantially the same as or similar to the filter 68 shown in FIG. 1. Such a filter can include filter media, e.g. fibrous, woven, fabric, or other porous particulate trapping media, alone or in combination with a neutralizing media, such as an activated charcoal, another activated material, and/or can also include another type of chemical/odor/taste neutralizing material.

Figure 5B:
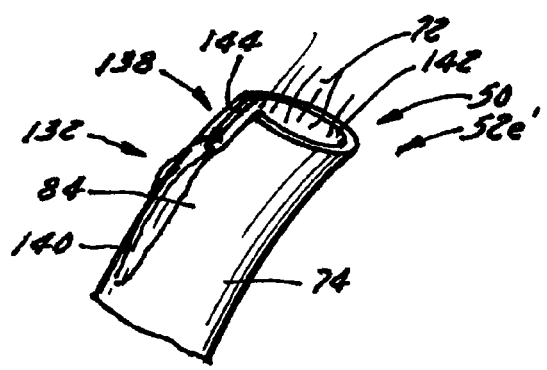
FIG. 5B is a fragmentary elevation view of a portion of the overflow tube of FIG. 5A.
Figure 5A:
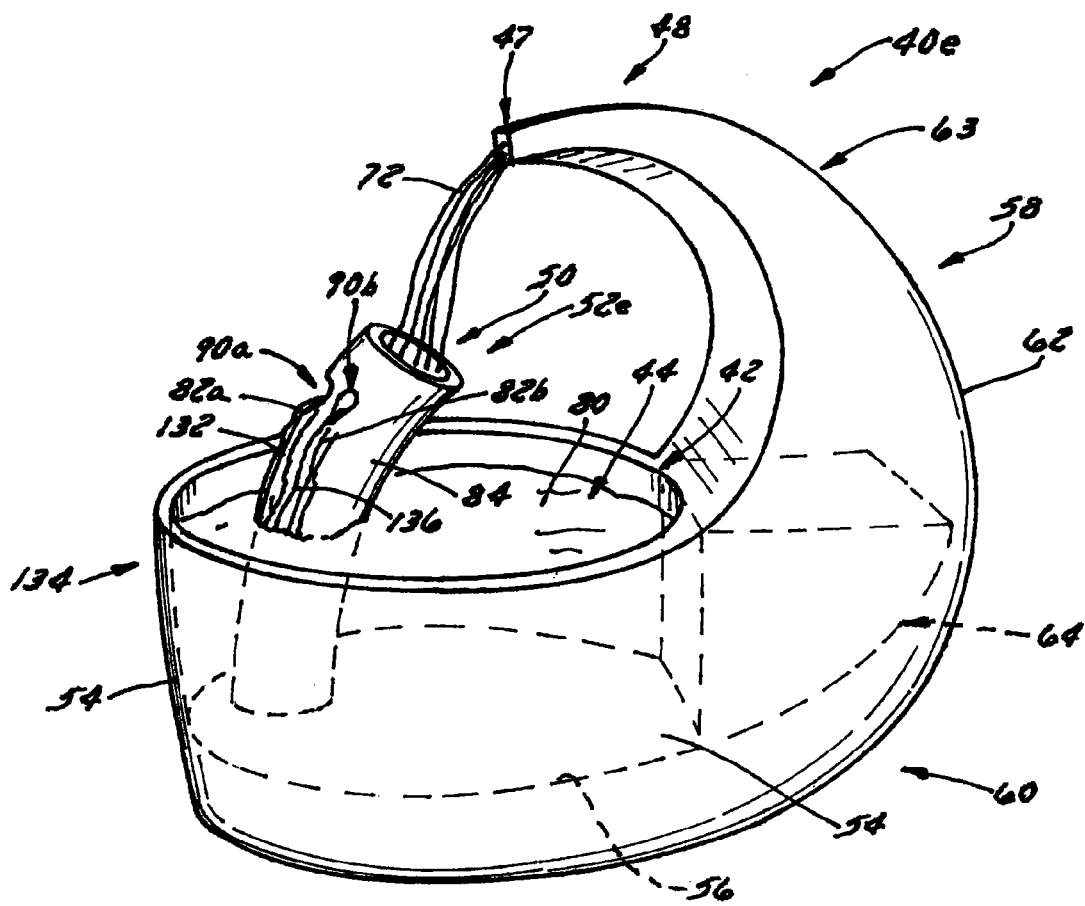
FIG. 5A is a perspective view of a fifth embodiment of a recirculating pet fountain equipped with a fifth preferred embodiment of an overflow tube.

FIG. 5A illustrates still another preferred embodiment of an overflow fountain 40*e* constructed in accordance with the present invention that has an overflow tube 52*e* configured to direct water overflowing 82 from the tube 52*e* down part 132 of an outer surface 84 of the tube sidewall 74 located close enough to an adjacent part 134 of the basin sidewall 54 that a pet, such as a cat, can drink from the overflowing water 82 while sitting or standing next to the fountain 40*e*. The overflow tube 52*e* is angled relative to the flow of water 72 being discharged from the fountain discharge 47 toward an adjacent part 134 of the basin sidewall 54 so that at least a portion 132 of the outer tube surface 84 facing towards the adjacent part 134 of the basin sidewall 54 is located close enough for a pet, such as a cat, sitting or standing next to the fountain 40*d* to reach the adjacent portion 132 of the outer tube surface 84 with their mouth, including their tongue, to drink. Angling the overflow tube 52*e* so the adjacent part 132 of the outer surface 84 of the tube sidewall 74 is inclined toward the adjacent part 134 of the basin sidewall 54, enables a pet, such as a cat, to be able to easily and conveniently drink overflowing water 82 flowing down the adjacent part 132 of the outer surface 84 of the tube sidewall 74 into the basin 42.

As is shown in FIG. 5A, the overflow tube 52*e* can be curved or have a curved portion that positions at least part 132 of its outer tube sidewall surface 84 close enough to an adjacent part 134 of the basin sidewall 54 that a pet, such as a cat, sitting or standing on the ground or floor next to that part 134 of the basin sidewall 54 can drink water overflowing from the tube 52*e*. The overflow tube 52*e* has at least one discharge port 90*a* facing generally outwardly toward the adjacent part 134 of the basin sidewall 54 so that overflow flows out the port 90*a* down part 132 of the outer tube sidewall surface 84 facing toward the adjacent part 134 of the basin sidewall 54 enabling a cat to drink the water flowing down that part 132 of the tube 52*e*. In the overflow tube embodiment shown in FIG. 5A, the overflow tube 52*e* has a plurality of discharge ports 90*a* and 90*b* formed in the adjacent part 132 of the outer surface 84 of the tube sidewall 74 facing toward the adjacent part 134 of the basin sidewall 54 to help make it easy and convenient for a pet, such as a cat, to drink water overflowing 82 from the ports 90*a* and 90*b*.

Although not shown, the overflow tube 52*e* can include a flow guide disposed adjacent the outwardly facing discharge port 90*a* that helps guide water flowing from the port 90*a* along the outwardly facing part 132 of the outer tube sidewall surface 84 that is disposed closest to and faces toward an adjacent part 134 of the basin sidewall 54. Such a flow guide can include a pair of upraised sides or edges that can be elongate and extend generally axially or longitudinally along part, e.g., outwardly facing part 132, of the outer tube sidewall surface 84 below and on either side of the outwardly facing discharge port 90*a*. In one embodiment, the flow guide is an elongate channel integrally formed in the outer tube sidewall surface 84 that extends from below the outwardly facing discharge port 90*a* downwardly toward the basin bottom 56.

If desired, the overflow tube 52*e* can include one or more discharge ports 90*b* disposed on either side of the outwardly facing port 90*a* through which water overflowing from the tube 52*e* can overflow out the port 90*b* substantially simultaneously with water flowing out the outwardly facing port 90*a*. If desired, the discharge ports 90*a* and 90*b* can be located close enough together such that each stream of water 82*a* and 82*b* flowing from them can converge as depicted in FIG. 5A to form a relatively smooth sheet 136 of water that flows downwardly over substantially one half of the outer tube sidewall surface 84 closest to the basin sidewall 54 facing toward the sidewall 54.

FIG. 5B illustrates another preferred embodiment of an overflow tube 52*e*' having a portion of its mouth 50 configured with an overflow director 138 facing outwardly generally toward the adjacent portion 134 of the basin sidewall 54 to direct water overflowing 140 from the tube 52*e*' downwardly along the outer surface 84 of the tube sidewall 74 toward the adjacent portion 134 of the basin sidewall 54. In the overflow tube embodiment shown in FIG. 5B, the outer edge 142 of the tube sidewall 74 that defines the mouth 50 has a cutout portion 144 that faces outwardly toward the adjacent portion 134 of the basin sidewall 54 that is an overflow director 138 to direct flow along part 132 of the outer tube sidewall surface 84 that faces toward the adjacent portion 134 of the basin sidewall 54. Such a cutout portion 144 can be a slot, such as the axially or longitudinally extending elongate slot depicted in FIG. 5B, a notch, or even a three-dimensionally contoured spout pointing toward an adjacent portion 134 of the basin sidewall 54.

If desired, the cutout portion 144 can be in fluid-flow communication with a channel (not shown), such as a generally U-shaped channel integrally formed in part 132 of the outer surface 84 of the tube sidewall 74 facing the adjacent portion 134 of the basin sidewall 54, that guides water flow so at least some of the overflowing water 140 flows down part 132 of the outer tube sidewall surface 84 close enough for a cat to drink. Although a single cutout 144 is shown in FIG. 5B, the overflow tube 52e' can be formed with more than one cutout 144, if desired, which are configured to cooperate with one another direct form or direct water overflowing from the tube 52e' so it flows down the part 132 of the tube sidewall surface 84 facing toward an adjacent (closest located) portion 134 of the basin sidewall 54.

Figure 6B:
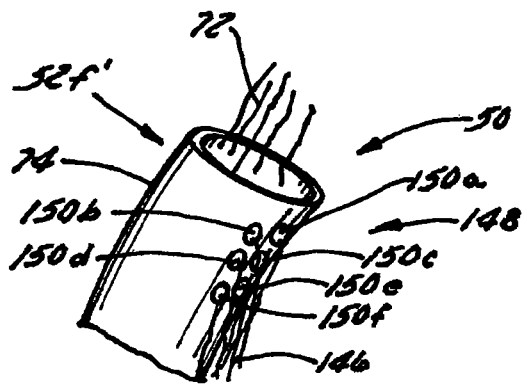
FIG. 6B is a fragmentary elevation view of a portion of the overflow tube of FIG. 6A.
Figure 6A:
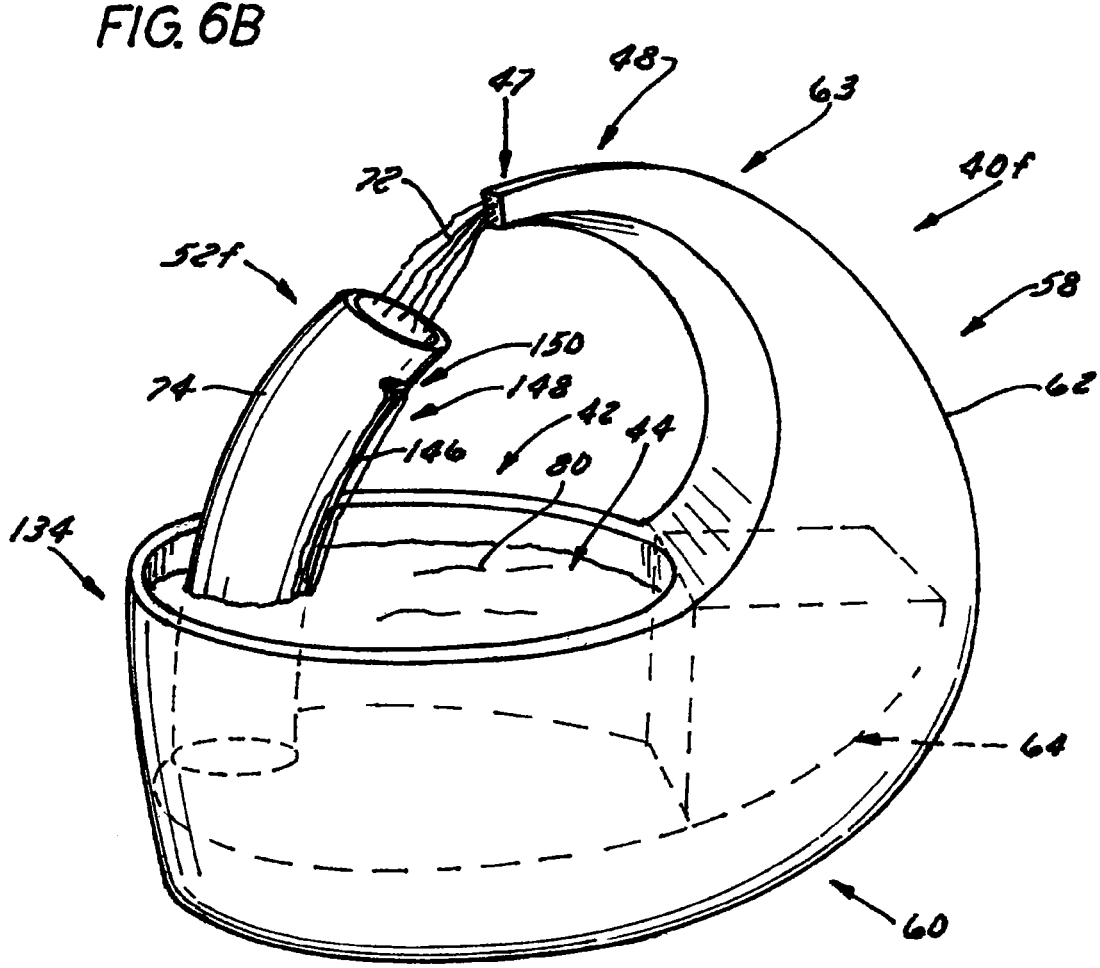
FIG. 6A is a perspective view of a sixth embodiment of a recirculating pet fountain equipped with a sixth preferred embodiment of an overflow tube.

FIG. 6A illustrates another preferred embodiment of an overflow fountain 40f having an angled or curved overflow tube 52f configured to direct overflowing water 146 so it flows down part 148 of an outer tube sidewall surface 84 that is inclined toward water 44 in the basin 42. The tube 52f is configured so that the amount of water that flows downwardly along the underside 148 of the tube sidewall surface 84 clings or adheres to the sidewall surface 84 via surface tension or capillary action thereby preventing water from dropping (or dripping) from the tube 52f into water 44 in the basin 42. As is shown in FIG. 6A, water can overflow from a discharge port 150 that is elongate, e.g., oblong, oriented generally transversely relative to the longitudinal or axial direction of the elongate tube 52f. Such an elongated discharge port 150 preferably is also elongated transversely relative to the direction of flow of water 146 overflowing out the port 150. Such a transversely oriented elongate port 150 can be configured to more evenly distribute a generally uniform flow, e.g. sheet 146, of water along the underside 148 of the outer surface 84 of the tube sidewall 74 facing toward or inclined toward the surface 80 of water 44 in the basin 42 so that it adheres or clings to the tube 52f all the way until it reaches the water 44 in the basin 42. Angling or orienting the tube 52f in such a manner having the overflow 146 being directed along the underside 148 to the tube 52f enables a cat to drink water 146 while it flows downwardly clinging to the underside 148 of the tube 52f. Such a fountain construction enables a cat to drink from water 44 in the basin 42, water free falling from the fountain discharge 47, or water 146 flowing down the basin-water facing underside 148 of the overflow tube 52f.

FIG. 6B illustrates another embodiment of an overflow tube 52f having a discharge port arrangement formed of a plurality of discharge ports 150a, 150b, 150c, 150d, 150e and 150f disposed along part of the underside surface 148 of the tube 52f that are configured and arranged to more evenly distribute water 146 discharged from the ports 150a-150f so it produces a more uniform sheet of water 146 that clings or adheres to the underside surface 148 of the tube 52f until it reaches the water 44 in the basin 42. As a result such a flow spreading discharge port configuration depicted in FIGS. 6A and 6B, splashing, dripping or dropping of water 146 flowing down the tube 52f or 52f into the water 44 in the basin 42 is prevented.

In one embodiment, the overflow tube is oriented, such as by being curved or angled, relative to the direction of flow of water being discharged from the fountain head outlet and/or relative to the generally horizontal surface of water in the basin so that water flows from the overflow tube downwardly along a top or outer surface of the tube sidewall and water flows from the tube downwardly along a bottom or underside surface of the tube sidewall. Such an overflow tube can be configured with one or more discharge ports that generally face outwardly toward a basin sidewall and one or more discharge ports that face generally downwardly toward the surface of the water in the basin creating at least one stream or sheet of water that adheres or clings to an outwardly facing portion of the outer tube sidewall surface, such as in the manner depicted in FIGS. 5 and/or 5A, until it reaches the water in the basin and at least one stream or sheet of water that adheres or clings to an inwardly or downwardly facing portion of the outer tube sidewall surface, such as in the manner depicted in FIGS. 6 and/or 6A, until it also reaches the water in the basin. Each of the discharge ports are configured and arranged to substantially simultaneously produce upper and lower streams or sheets of water that both cling or adhere to the tube until it reaches water in the basin without dripping, splashing or otherwise freefalling from the tube into the basin.

Such a fountain construction advantageously caters to cats having many different types of drinking preferences. Such a fountain construction provides an open basin from which a cat can drink from water in the basin. Such a fountain construction provides a free-falling stream of water from which a cat can drink, if they prefer. Such a fountain construction also advantageously provides a relatively smoothly flowing stream or sheet of water flowing down an outwardly facing outer surface of the overflow tube sidewall that faces outwardly toward part of a basin sidewall enabling a cat to drink water while sitting or standing without having to crane their neck towards water in the basin. Such a fountain construction further advantageously provides a relatively smoothly flowing stream or sheet of water flowing down a downwardly facing surface of the tube sidewall, e.g. downwardly inclined surface; it can be disposed so it faces towards water in the basin for cats that prefer to drink from flowing water in such an orientation.

Figure 7B:
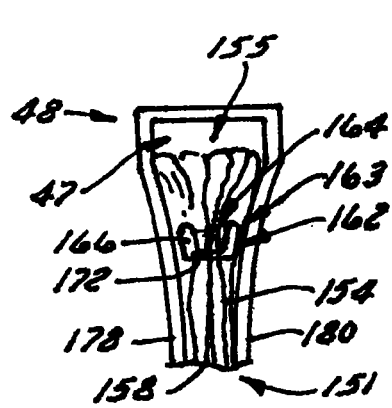
FIG. 7B is a fragmentary top plan view of a portion of the channel of FIG. 7A.
Figure 7C:
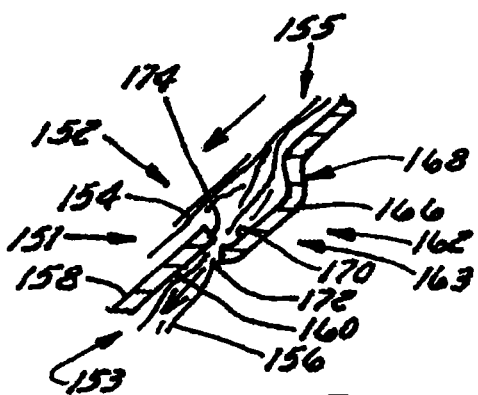
FIG. 7C is a fragmentary cross sectional view of a portion of the channel of FIG. 7A.
Figure 7A:
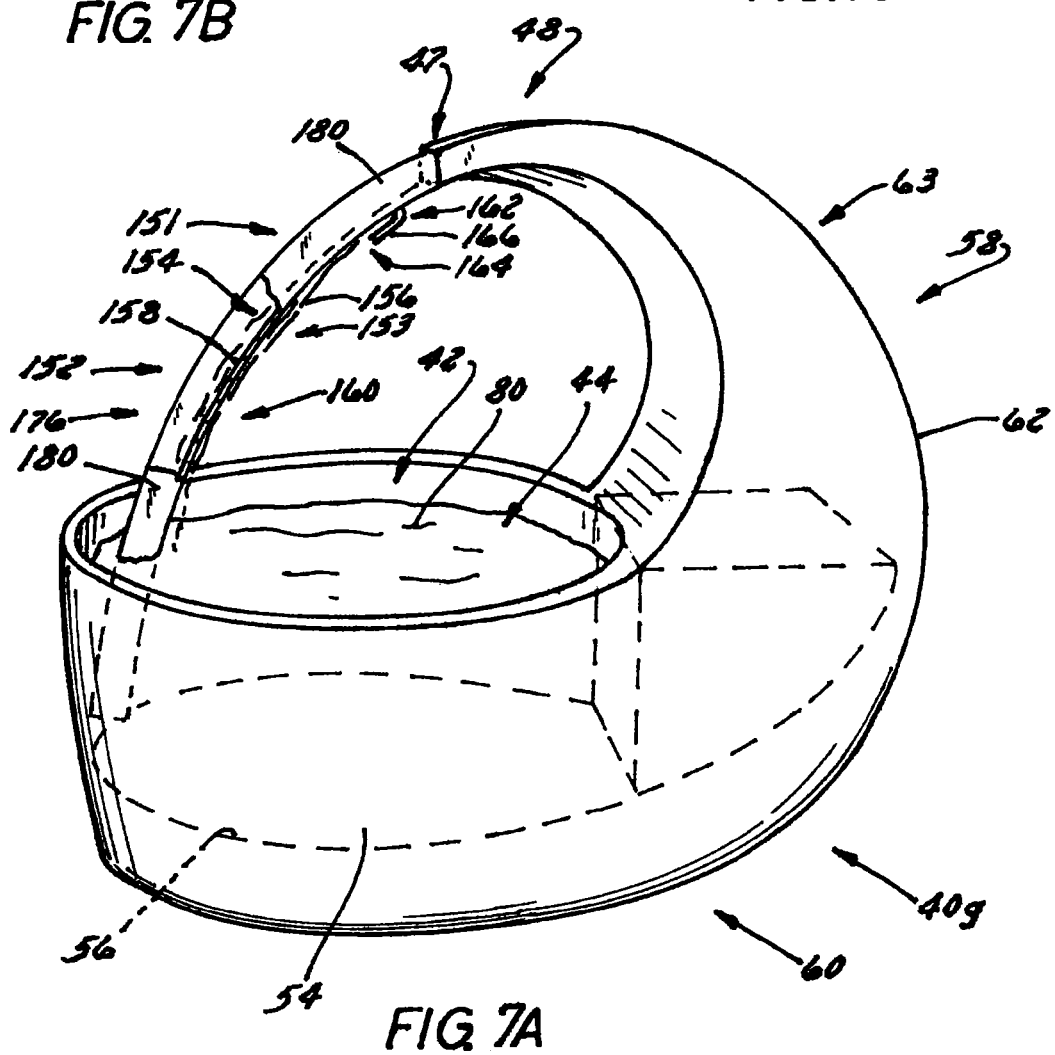
FIG. 7A is a perspective view of a seventh embodiment of a recirculating pet fountain equipped with a flow-conducting channel with a flow splitter directing flow along the top and bottom of the channel.

FIG. 7A illustrates a still further preferred fountain 40g that can be configured to be used with an overflow tube, such as any one of the overflow tube embodiments discussed above, but which includes a water-conveying bridge 151 that conveys water expelled from discharge 47 toward the basin 42. The bridge 151 shown in FIG. 7A extends to the water line 80 of water 44 in the fountain basin 42 but can extend to the mouth, e.g., mouth 50, of an overflow tube, such as one or more of tubes 52a-52f, if desired. During recirculating fountain operation, a water stream 156 clings or adheres via surface tension to an underside 153 of the bridge 151 as the water stream 156 flows toward water 44 in the basin 42.

The bridge 151 is formed of a generally U-shaped water-transport channel 152 which conveys water streams 154 and 156 from water expelled from the fountain discharge 47 along opposite sides 178 and 180 of the channel 152 into water 44 in the basin 42 below. The channel 152 has a channel bed 158 on which one stream 154 of water flows and has an underside 160 along which another water stream 156 clings via surface tension until both water streams 154 and 156 flows into water 44 in the fountain basin 42 below.

A flow splitter 162 disposed adjacent the fountain discharge 47 splits or separates the flow of water 155 exiting the fountain discharge 47 into a first stream of water 156 that clings or adheres to the underside 160 of the channel bed 158 via surface tension or capillary action until the lower stream 156 flows into water 44 in the fountain basin 42. The flow splitter 162 is configured so that at least some of the flow of water 155 exiting the discharge 47 stays on the bed 158 forming a second stream of water 154 that flows on top of the bed 158 until the upper stream 154 flows into water 44 in the basin 42.

As is shown in FIGS. 7B and 7C, the flow splitter 162 works in concert with a flow separating aperture 164 formed in the bed 158 that extends completely through the bed 158 allowing some water exiting the fountain discharge 47 to be directed by the flow splitter 162 so its thrust carries it generally parallel to the underside 160 of the bed 158 so it clings or adheres to the underside 160 via surface tension without dripping or free-falling into water 44 in the basin 42 below until the water stream 156 reaches the water 44 in the basin 42.

The flow splitter 162 includes a flow diverter 163 that includes a flow diverting tongue 166 defined by a flow separating aperture 164 that can be generally U-shaped, like the aperture 164 depicted in FIG. 7B. The tongue 166 can be elongate, face in the direction of water flow, and can include an offset 168 that offsets a flow directing upper surface 170 extending generally in the same direction as an adjacent portion of the bed 158 below an adjacent downstream portion of the underside 160 of the bed 158 so the separated stream 156 is directed generally along the underside 160 so it clings or adheres via surface tension or capillary action to the underside 160. The tongue 166 can have a width substantially same as that of the bed 158 to help spread flow of the diverted stream 156 along substantially the entire width of the underside 160 of the bed 158.

In a preferred but exemplary embodiment, the tongue 166 extends in the direction of water flow and can have a generally L-shaped longitudinal cross-section with the offset 168 being a bend or angle from which a flow directing surface 170 extends that is generally parallel to the underside 160 of the bed 158. In the preferred but exemplary embodiment shown in FIG. 7C, the flow directing surface 170 of the flow spreading tongue 166 is offset below and generally parallel to the portion of the underside 160 of the bed 158 immediately downstream of the flow splitter 162. As discussed in more detail below, the flow splitter 162 can also be configured to spread out the flow of water along the underside 160 of the channel.

If desired, the tongue 166 can be configured so its forward edge 172 extends beyond the flow separating aperture 164, such as depicted in FIG. 7C, to help ensure separated flow 156 will cling or adhere via surface tension or capillary action to the underside 160 of the bed 158. If desired, the forward edge 172 of the flow separating tongue 166 can be formed with an upturned lip, such as also depicted in FIG. 7C, that extends upwardly toward an adjacent part of the underside 160 of the bed 158 to control the width of the gap or space between the tongue 166 and the underside 160 of the bed 158 defined by part of the aperture 164. If desired, a leading edge 174 of the bed 158 can be tapered, such as to a knife-edge, to help split the flow of water exiting the fountain discharge 47 into the upper and lower water streams 154 and 156, such as further depicted in FIG. 7C.

If desired, the flow splitter 162 can be configured so all or substantially all of the flow being pumped upwardly from the basin 42 flows along the underside 160 clinging via surface tension to the underside 160 until it reaches water 44 in the basin 42. Such a configuration preferably does so without any of the water flowing along the underside 160 dripping or otherwise free-falling into the water 44 in the basin 42 below. While the flow splitter 162 can be disposed in a channel 152, such as depicted in FIGS. 7A-7B, the flow splitter 162 can be disposed, e.g., molded or snapped into, in the fountain head 48 or another part of the arm 62 in communication with the fountain head 48, whether or not the fountain is configured to produce an upper stream of water 154.

If desired, part of the bed 158 adjacent and/or along the leading edge 174 can be upraised in lieu of or in addition to the downwardly offset flow splitter 162 to help split flow. For example, if desired, part of the bed 158 can be shaped similarly to or same as the flow splitter 162 shown in one or more of FIGS. 7A-7C but oriented, e.g., flipped over or conversely oriented, so it is upraised relative to a downstream disposed part of the bed 158 forming a flow diverter that catches some of the water being expelled from the fountain discharge 47 and diverting it to form stream 156. Where so conversely oriented, the flow-diverting tongue 166 extends in a direction opposite of flow and has an offset spacing its leading edge 172 above the channel bed 158.

In the preferred embodiment shown in FIGS. 7A-7C, the water-conveying channel 152 is a curved arch 176 having a pair of upwardly extending sides 178 and 180 spaced apart by the bed 158 over which the upper stream 154 of water flows during recirculating fountain operation defining a generally U-shaped channel 152. The bed 158 can be flat or generally planar in a transverse direction, such as is depicted in FIG. 7B, but can be concave or convex if desired. In another preferred embodiment, the sides 178 and 180 are defined by the outer side edges of a bed 158 having a generally concave transverse contour. The underside 160 of the bed 158 along which the bottom water stream 156 flows can have a similar transverse cross-sectional configuration. For example, the underside 160 can be substantially planar in a transverse direction, concave, or convex. Underside 160 can also have a pair of spaced apart downwardly extending side edges if desired.

Such a fountain construction produces upper and lower streams 154 and 156 that flow down opposite sides of the arched or curved water-transport channel 152 enabling a cat sitting or standing on the floor or ground upon which the fountain 40g rests to (a) drink from water 44 in the basin 42, (b) drink from the upper stream of water 154 flowing down the bed 158 of the channel 152, and/or (c) drink from the lower stream of water 156 flowing down the underside 160 of the bed 158 clinging by surface tension to the underside 160. In a method of operation, water is pumped out the fountain discharge 47 at a flow rate that enables water to flow along the underside 160 until it reaches water 44 in the basin 42 without free-falling or dripping from the underside 160 into water 44 in the basin 42. In one method of operation, water is pumped from the basin 42 to an elevation above the basin 42 where it then flows along the underside 160 until it reaches water 44 in the basin 42 without free-falling or dripping from the underside 160 into water 44 in the basin 42. In another preferred method of operation, water pumped from the basin.

If desired, an embodiment of the water-conveying bridge 151 shown in FIGS. 7A-7C can be modified for use with any one of the overflow tube embodiments 52a-52f shown in FIGS. 1-6A so water flows along the bridge 151 into the mouth 50 of the overflow tube, including by free falling from an end of the bridge 151 into the overflow tube mouth 50. Such a water-conveying bridge 151 can be configured with a flow splitter 162 that splits the flow of water exiting from the fountain discharge 47 into a plurality of water streams with at least one of the streams 156 clinging to an underside 153 of the bridge 151 via surface tension or capillary action until it either flows into the overflow tube mouth 50 and/or water 44 in the basin 42. Such a flow splitter 162 can be configured to split water exiting the discharge 47 into upper and lower streams 154 and 156 with one or both of the streams 154 and/or 156 being received in the overflow tube mouth 50.

Figure 8:
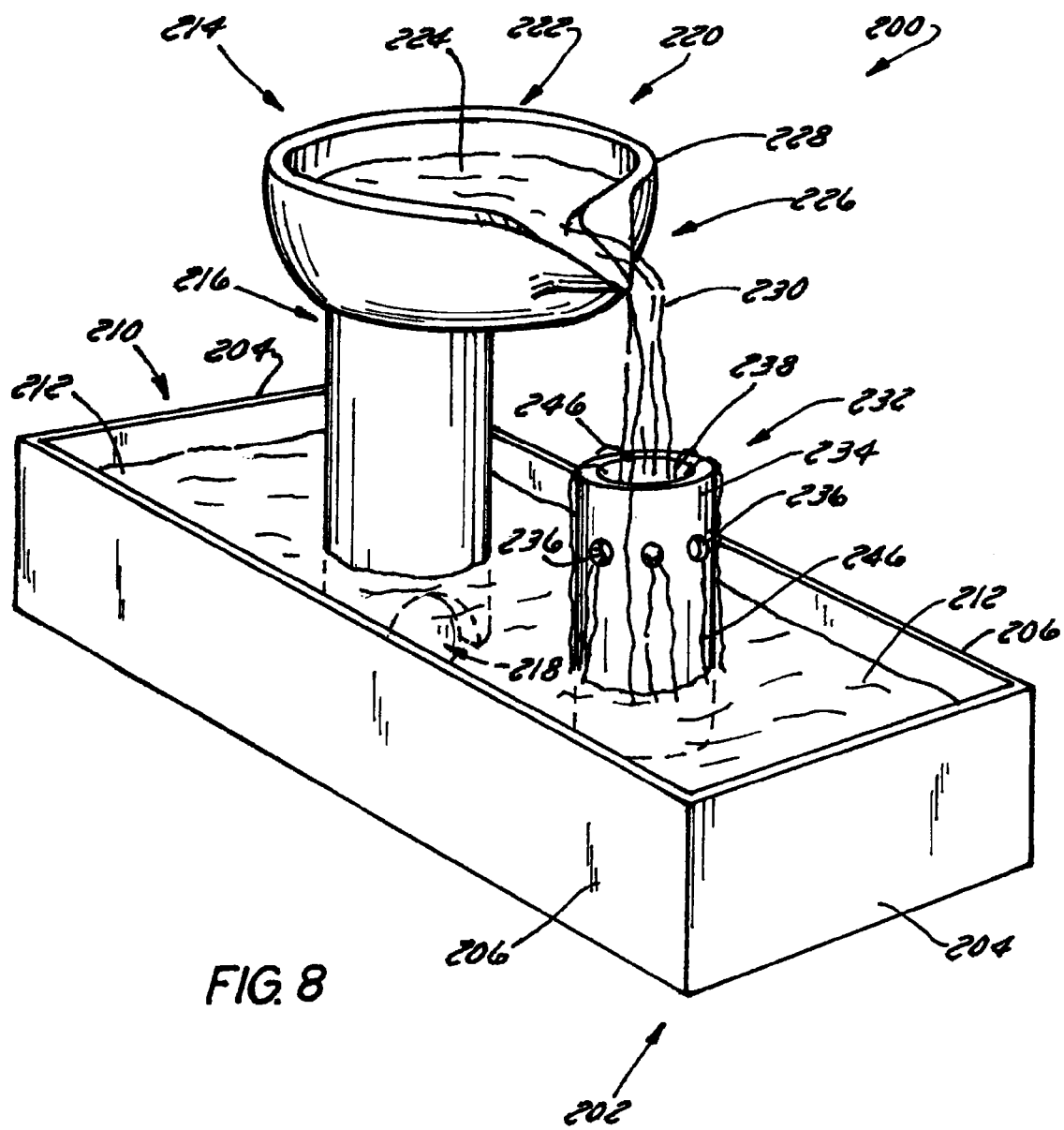
FIG. 8 is a perspective view of another preferred recirculating pet fountain constructed with a pedestal with a spout that discharges water into an overflow.
Figure 9:
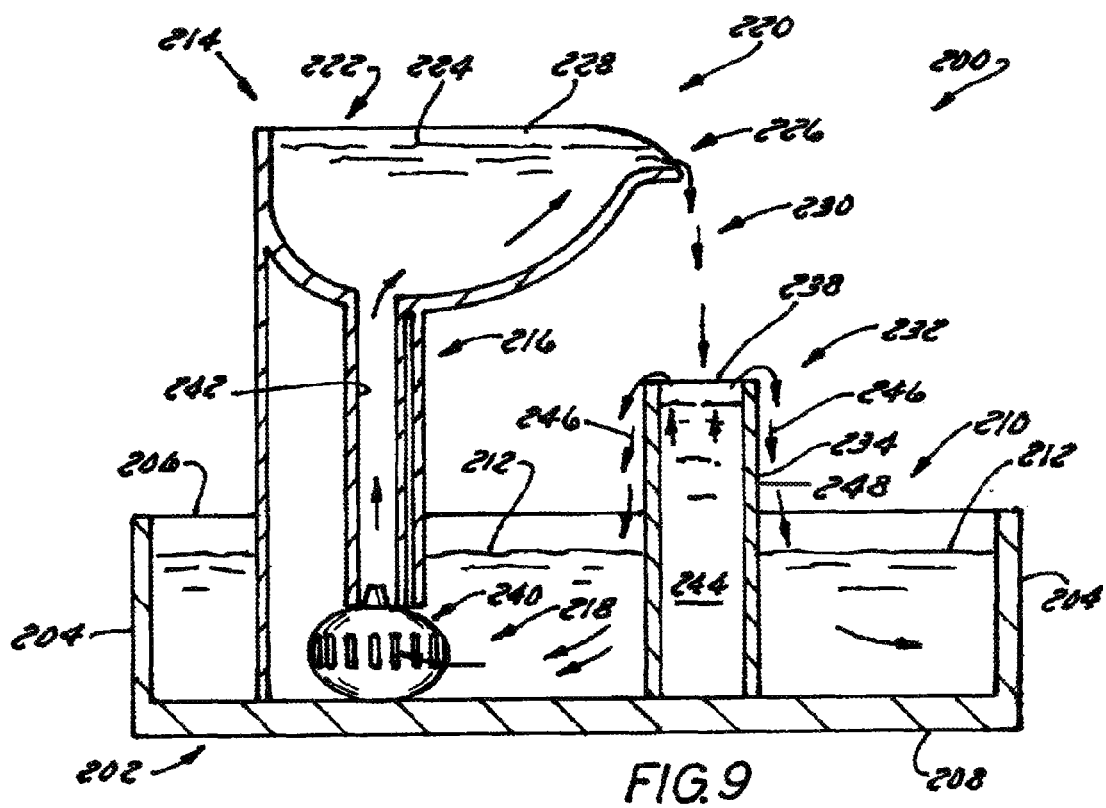
FIG. 9 is a cross sectional view of the fountain of FIG. 8.
Figure 10:
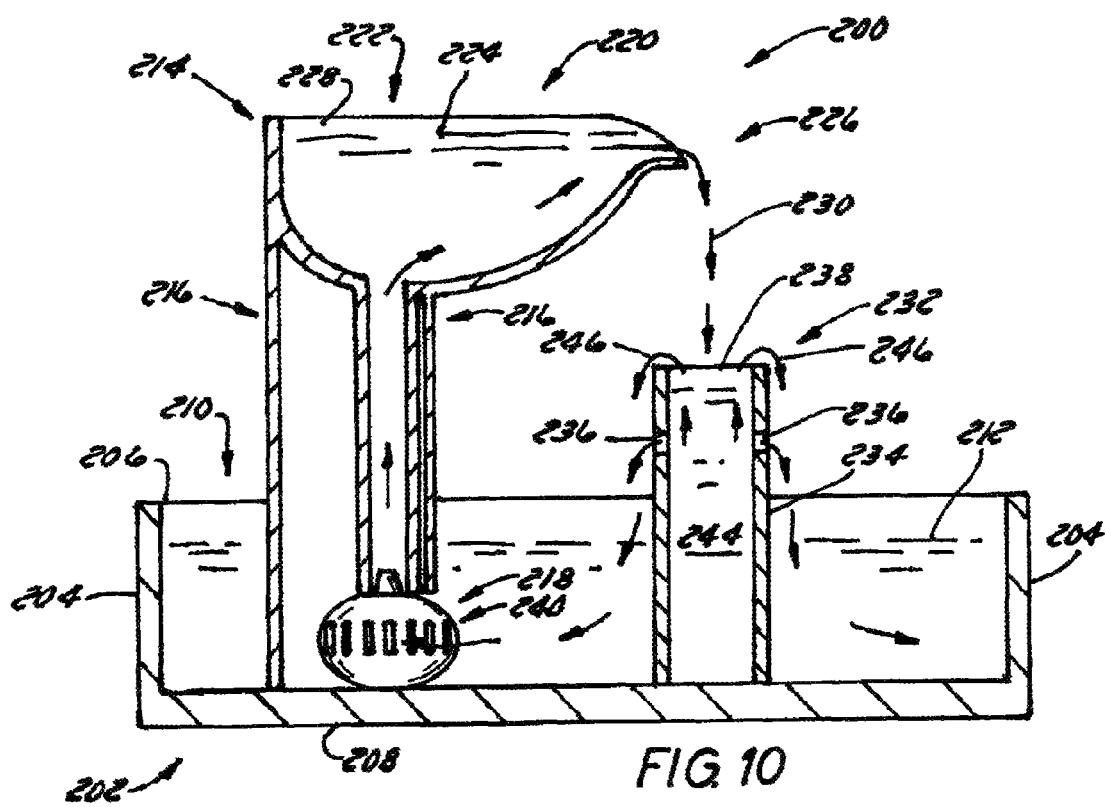
FIG. 10 is a cross sectional view of the fountain of FIG. 8 having an overflow tube equipped with discharge ports through which water overflows during fountain operation.

FIGS. 8-10 illustrate another preferred embodiment of a overflow tube equipped recirculating pet fountain 200 that is particularly well suited for use by cats but which also can be used by other pets, including dogs. The fountain 200 has a base 202 that rests on a generally flat surface, such as a floor or the ground, which includes sidewalls 204 and 206 that extend upwardly from a bottom wall 208 (FIG. 9) to define a water holding basin 210 which holds water 212. As with the other drawing figures, the basin 210 is open thereby allowing an animal to drink from water 212 in the basin 210.

The fountain 200 has a pedestal 214 that extends upwardly from the basin 210 that is defined by a tubular upright 216 having an intake opening 218 in fluid-flow communication with water 212 in the basin 210. The pedestal 214 includes an upper basin 220 that can be open as depicted defining an upper drinking bowl 222 from which a pet can also drink water 224. The upper bowl 222 includes a discharge spout 226 that can be integrally formed of part of its sidewall 228 from which a stream of water 230 free falls into an overflow tube 232 extending upwardly from the lower basin 210 a distance from the tubular upright 216 of the pedestal 214.

Water discharged from the spout 226 free falls into an overflow tube 232 that can be formed of a tubular sidewall 234 of endless construction that can be imperforate or which can include a plurality of spaced apart discharge ports 236, such as the ports shown in phantom in FIG. 8 and in solid in FIG. 10, spaced from the mouth 238 of the tube 232. During operation, water 212 in the basin 220 is drawn through a pump module 240 containing a submersible pump, e.g., aquarium pump, and pumped upwardly through a water-conveying conduit 242 into the upper bowl 222 where it causes the bowl 222 to fill up with water 224. Water pumped upwardly to the upper bowl 222 fills up the bowl 222 until a stream of water 230 flows from the spout 226 free-falling into the mouth 238 of the overflow tube 232 disposed below the spout 226.

Water received in the mouth 238 of the overflow tube 232 fills up a water-holding cavity 244 within the tube 232 until water 246 either overflows back out the mouth 238 of the tube 232, such as depicted in FIG. 8, or out discharge ports 236 in the tube sidewall 234, such as depicted in FIG. 10. Overflowing water 246 flows down the outer surface 248 of the tube 232 into water 212 in the basin 210.

The upper bowl 222 can be configured to be removably attached, e.g., via snap-fit, twist fit, frictional engagement, to the tubular upright 216 in a manner enabling other types of upper basins and/or bowls to be attached to the upright 216 enabling a purchaser to build their own fountain. Such a modular upper basin or upper bowl construction advantageously allows a bigger upper basin or upper bowl that is better configured for a dog to drink from.

Figure 11:
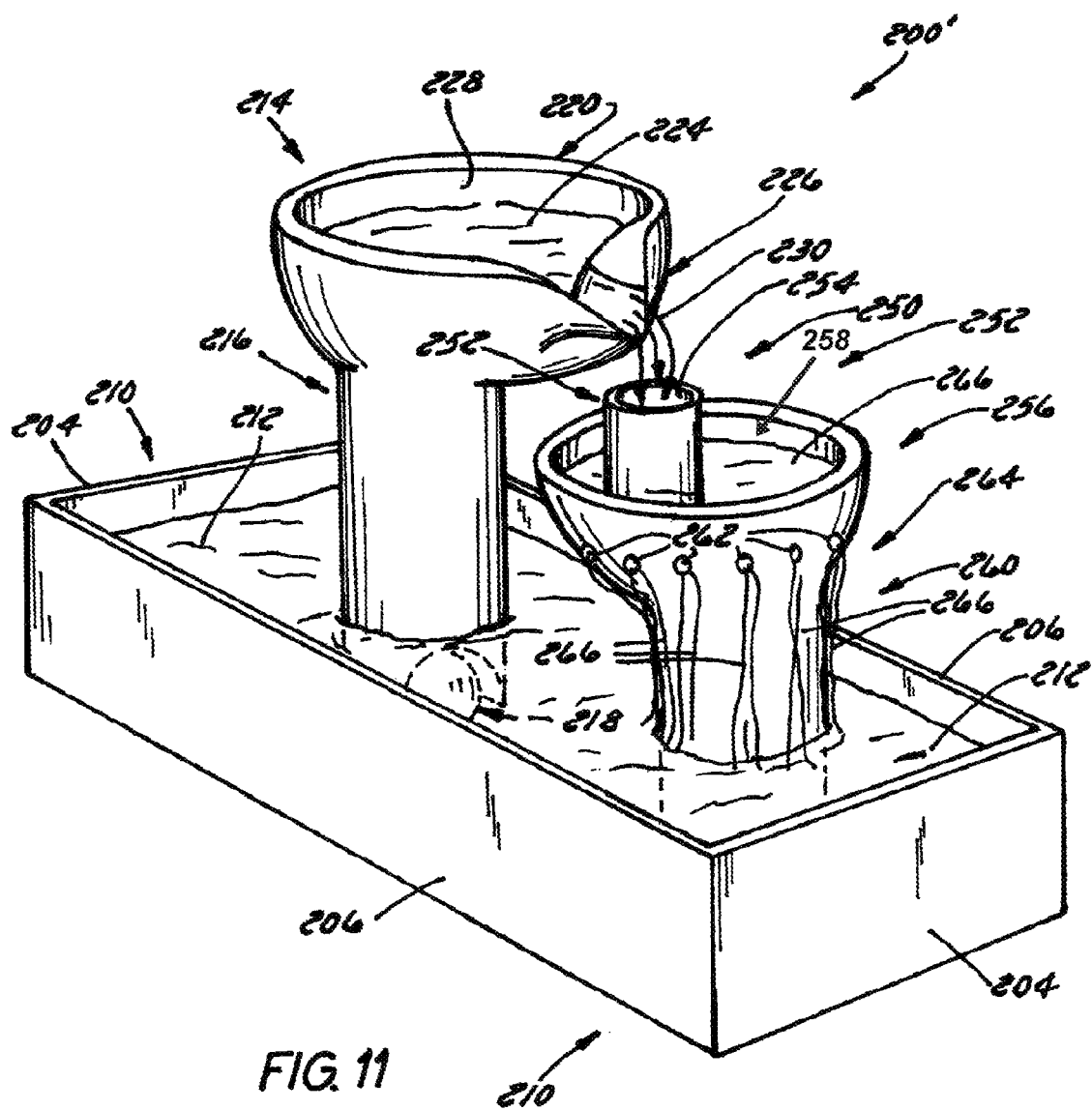
FIG. 11 is a perspective view of still another preferred recirculating pet fountain construction equipped with an overflow tube arrangement that includes a drinking bowl whose level of water in the drinking bowl is controlled though overflow discharge ports through which water in the bowl flows when it reaches the height of the discharge ports.

FIG. 11 illustrates another preferred recirculating fountain embodiment that includes an overflow tube arrangement 250 with an overflow tube 252 that delivers water free-falling into its mouth 254 into an intermediate basin 256 that can be an open drinking bowl 258 from which a pet can drink from. The intermediate drinking bowl 258 extends upwardly from a tubular base 260 attached to the bottom wall of the bottom basin 210. The intermediate drinking bowl 258 can include a plurality of spaced apart discharge ports 262 that can be arranged in an annularly extending row 264 from which water 266 in the intermediate drinking bowl 258 flows when the water in the bowl 258 reaches the height of the ports 262.

The intermediate bowl 258 and/or tubular base 260 can also be of removable and replaceable configuration, enabling a purchaser to purchase intermediate bowls or other components having differing configurations or constructions that carry an overflow tube arrangement same as or similar to that shown in FIG. 11. Such a removable and/or replaceable construction enables purchasers to build their fountain with different modules that can be used to form or replace one or both of bowls 222 and/or 258 with modules having differing configurations that need not necessarily include a drinking bowl.

FIG. 12 illustrates another preferred embodiment of a recirculating overflow fountain 40h that includes an overflow tube 52g extending upwardly out of a drinking basin 42' that holds water 44 that is drunk by a cat or other pet during use or operation. Overflow tube 52g of this embodiment is shown as having a sidewall 74 that is devoid of overflow guides such that the outer surface 84 of the sidewall 74 may define a continuous outer circumferential surface along its entire length and about its entire periphery. The water overflowing 82 from the tube 52g exits the outer portion of mouth 50 after being received into a central portion of mouth 50 from bridge 117' that may be defined by a generally U-shaped water transport channel 118'.

Referring now to FIG. 13, channel 118' may include a back wall 268 and side walls 270, 272 arranged transversely on opposite sides of the back wall 268. In this embodiment, the back and side walls 268, 270, 272 are integrally formed with each other and are curved continuously so as to define a convex side 274 having a convex surface 276 that extends along the back and side walls 268, 270, 272 and faces generally toward the arm 62 of the fountain 40h and at least a portion of which also faces generally toward the lower drinking bowl 43 (FIG. 12). Opposite the convex side 274, the back and side walls 268, 270, 272 in combination define a concave side 278 having a concave surface 280 that faces generally away from the arm 62 of the fountain 40h (FIG. 12). The concave surface 280 may define a U-shaped channel that directs water in the water stream 120 to flow along the bridge 117' so as to present the water stream 120 in the opposite direction of the arm 62 (FIG. 12). This allows an animal, such as a cat, to drink from the water stream 120 while it flows along the bridge 117'.

Referring again to FIG. 12, a lower end 282 of the channel 118' may extend into an interior space 284 of the overflow tube 52g so that at least a portion of the lower end 282 is arranged concentrically inward of the side wall 74 of the overflow tube 52g. In this way, the lower end 282 of the channel 118' may define an outlet end of the channel 118', whereas an inlet end of the channel 118' may be defined by an upper end 286 that connects to a basin 220' at an outlet 288 arranged to allow water to pass through a portion of the sidewall 228 and flow into the channel 118' for delivery to the overflow tube 52g. The outlet 288 may be defined by a lower outlet wall 290 and a pair of opposing outlet sidewalls 292, 294 that extend upwardly from the lower outlet wall 292 and connect to an upper edge 296 of the sidewall 228. In this embodiment, the basin 220' is connected to the arm 62 of fountain 40h in a cantilevered-type manner by the arm 62 being connected to a portion of the sidewall 228 that faces away from the overflow tube 52g. In this way, an entire bottom wall 298 of the basin 220' may be exposed and face toward the basin 42' that is arranged at least partially below the basin 220'. As shown, the basin 220' may be supported on opposing sides from respective interconnections between the side wall 228 and the arm 62 and bridge 117', defining a space 300 between the upper basin 220' and the lower basin 42' of the overflow fountain 40h.

Still referring to FIG. 12, a discharge 47' of the conduit 70 is arranged at a location of the connection between an upper end of the arm 62 and basin 220' so that the discharge 47' of conduit 70 and the outlet 288 are on opposing sides of the basin 220'. In this embodiment, the discharge 47' extends through the sidewall 228 and is provided at a lower height upon the sidewall 228 than the lower outlet wall 290 such that the discharge 47' is arranged below a water level 302 of the basin 220'. This may allow water to flow out of the discharge 47' into a volume of water 224 below an upper surface that defines the water level 302, which may minimize surface disruption of the water 224 in the basin 220' from which an animal, such as a cat, may drink. The basin 220' may extend partially transversely beyond a projection of a perimeter of the drinking bowl 43 and the discharge 47' may deliver water into the basin 220' at a location that is transversely outside of the projected perimeter of the lower drinking bowl 43.

Still referring to FIG. 12, the animal may at least partially support itself while drinking from the overflow fountain 40h from a step 304 that is arranged generally opposite the arm 62 with respect to the basin 42'. In this embodiment, the step 304 is defined by a shelf 306 that extends generally parallel to the bottom wall 56 and generally perpendicular with respect to an upper portion(s) of the sidewall 54 of the basin 42'. As shown, the shelf 306 may define a lower surface 308 that faces downwardly toward the water 44 in the lower drinking bowl 43. The lower surface 308 may be vertically spaced from the water level 80. An upper surface 310 of the shelf 306 faces upwardly away from the water 44 and may include a gritty or other coating 312 which may enhance traction for paws, for example, the front paws, of the animal that is drinking from the overflow fountain 40h. The step 304 may allow the animal to lower its head to drink from the lower drinking bowl 43, to extend its head upwardly to drink from the upper drinking bowl 222, or from water running along the bridge 117'.

The present invention is directed to a recirculating pet water fountain that includes a water-holding basin, a discharge located above the basin, and a pump in fluid flow communication with water in the basin that delivers water from the basin to the discharge. One fountain embodiment includes an overflow tube having a mouth receiving water from the discharge that overflows from the overflow tube into the basin. Another fountain embodiment includes a water-conveying bridge along which water can cling via surface tension to an underside of the bridge while flowing toward water in the fountain basin. Water clinging via surface tension to the bridge underside can flow directly into the basin or into the mouth of an overflow tube.

The mouth of the overflow tube is disposed above a water line of water in the basin and water from the discharge can free fall into the mouth of the overflow tube. The overflow tube can extend upwardly from a bottom of the basin. The overflow tube can be length adjustable enabling the length of the overflow tube to be changed to change the distance the overflow tube mouth is spaced above a water line of water in the fountain basin. The overflow tube can be movably coupled to an overflow tube anchor carried by the basin permitting relative movement therebetween in adjusting overflow tube length. The overflow tube anchor can be formed of or include a tube extending upwardly from a bottom of the basin that telescopically couples with the overflow tube.

A flow adjuster can be carried by the overflow tube that is movable relative to the overflow tube between a first position where the flow adjuster extends outwardly beyond the mouth of the overflow tube and a second position where the flow adjuster is disposed below the mouth of the overflow tube. The flow adjuster can be formed of or include a collar telescopically carried by the overflow tube. Such a collar can be tubular and can be formed of a generally cylindrical tube.

One overflow tube embodiment has an intake disposed below a water line of water in the basin with the intake being in fluid-flow communication with the pump. The overflow tube can be formed of an endless sidewall with at least one discharge port formed in the tube sidewall that is located between the overflow tube mouth and the water line of water in the basin with water received in the overflow tube flowing out the at least one discharge port into the basin. The intake is formed of a perforate intake grate formed in the overflow tube sidewall.

Another overflow tube embodiment has an endless sidewall with at least one discharge port formed therein located between the overflow tube mouth and a water line of water in the basin with water received in the overflow tube flowing out the at least one discharge port into the basin. The at least one discharge port can include a flow director that directs water overflowing from the overflow tube out the at least one discharge port in a desired flow direction along the outside of the overflow tube. The flow director can be formed of a pair of converging side edges of the at least one discharge port that converge in a desired direction along which water flowing out the at least one discharge port is directed.

The overflow tube can include a flow adjuster carried by the tube that is movable relative to the tube between a first position where the flow adjuster covers the at least one discharge port blocking flow of water through the at least one discharge port and a second position uncovering the at least one discharge port permitting flow of water through the at least one discharge port. The flow adjuster can be formed of or include a collar telescopically carried by the overflow tube.

An overflow tube embodiment has a plurality of discharge ports formed in the overflow tube sidewall spaced apart from each other different distances from the overflow tube mouth. The overflow tube can include a flow adjuster carried by the tube that is movable relative to the tube between (a) a first position where the flow adjuster covers one discharge port blocking flow of water through the one discharge port and uncovers another discharge port permitting flow of water through the another discharge port, and (b) a second position uncovering the one discharge port permitting flow of water through the one discharge port and covering the another discharge port permitting flow of water through the another discharge port. Such an overflow tube can be configured with a plurality of spaced apart sets of a plurality of discharge ports with (a) one set of a plurality of discharge ports covered and another set of a plurality of discharge ports uncovered by the flow adjuster when disposed in the first position and (b) the one set of the plurality of discharge ports uncovered and the another set of the plurality of discharge ports covered by the flow adjuster when disposed in the second position. The discharge ports of one set of plurality of discharge ports can be arranged in a first row spaced a first distance from the mouth of the overflow tube and the discharge ports of the another set of plurality of discharge ports can be arranged in a second row spaced a second distance from the mouth of the overflow tube that is farther away from the mouth than the first distance.

In one fountain embodiment, the fountain basin has a basin bottom bounded by an upwardly extending basin sidewall and the overflow tube is defined by an endless sidewall having an outer surface facing toward an adjacent portion of the basin sidewall configured so water overflowing from the overflow tube flows down part of the outer overflow tube sidewall surface facing toward the adjacent portion of the basin sidewall so a pet can drink from water flowing down the tube sidewall. The overflow tube can be curved or angled relative to a stream of water free falling from the discharge into the mouth of the tube. The overflow tube can include a discharge port formed in the tube sidewall that directs flow of water received from the discharge into the overflow tube mouth out the discharge port flowing down at least a portion of the outer overflow tube sidewall surface facing toward the adjacent portion of the basin sidewall. The discharge port can be a hole in the tube sidewall, a slot extending transversely relative to a longitudinal extent of the tube, and can include a flow director that directs water flowing out the discharge port in a desired flow direction along the outer overflow tube sidewall surface.

The flow director can be formed of a pair of converging side edges of the discharge port that converge in a desired direction along which water flowing out the discharge port is directed. The flow director can also be formed in the mouth of the overflow tube such as by being formed in an outer edge of the mouth of the tube. Such a flow director can be formed of a cutout in the edge of the overflow tube that forms the mouth of the tube. The cutout can be slot extending from the mouth in a generally longitudinal direction along the tube.

In a still further overflow tube embodiment, the overflow tube is defined by an endless sidewall having an outer surface of the overflow tube sidewall with part of the outer overflow tube sidewall surface facing generally toward an adjacent portion of water in the basin and water overflowing from the overflow tube clings or adheres via surface tension to the part of the outer overflow tube sidewall surface facing generally toward water in the basin as the overflowing water flows into the basin. The overflow tube can be curved or angled relative to a stream of water free falling from the discharge into the mouth of the overflow tube. The overflow tube can include a discharge port that directs flow of water overflowing from the tube along part of the outer overflow tube sidewall surface facing generally downwardly toward water in the basin.

A further fountain embodiment has a water-conveying bridge along which water flows from the fountain discharge downwardly into the mouth of an overflow tube. The bridge can be configured so water clings to its underside as it flows down the bridge. The underside of the bridge can be curved or arched along its lengthwise extent. The bridge can include or be formed of an elongate channel extending from the discharge to the overflow tube. The channel can be configured so it has an upturned generally U-shaped cross section transverse to its longitudinal extent.

Another water-conveying bridge embodiment has a flow splitter that splits the stream of water from the discharge into a lower stream clinging or adhering via surface tension to the underside of the bridge flowing toward the basin and an upper stream carried by an upper side of the water-conveying bridge flowing toward the basin. The flow splitter can be located downstream of the discharge. The flow splitter can include or be formed of a flow diverter that diverts water flowing out the discharge to the underside of the bridge. The flow splitter can be formed or include a flow diverting tongue and flow diverting aperture formed in the bridge through water is diverted and flows toward the underside of the bridge.

The water-conveying bridge can be formed of or include a water-transport channel that can be generally U-shaped and elongate. The water-transport channel can extend from the fountain discharge to the fountain basin. Where the fountain includes an overflow tube, the water-transport channel can extend from the discharge to the overflow tube.

A further fountain embodiment has at least a first basin and a second basin that may be arranged at different heights to define upper and lower drinking bowls. The upper drinking bowl may extend partially over the lower drinking bowl and partially transversely beyond a perimeter of the lower drinking bowl. The upper drinking bowl may be cantilever supported by an arm that extends from the lower drinking bowl or may be supported from opposing sides by an arm and a bridge that extend toward the lower drinking bowl and engage the sidewall of the upper drinking bowl. A step may be arranged with respect to the lower drinking bowl that allows an animal to lower its head to drink from the lower drinking bowl or to extend its head upwardly to drink from the upper drinking bowl or from water running along the bridge.

It is also to be understood that, although the foregoing description and drawings describe and illustrate in detail one or more preferred embodiments of the present invention, to those skilled in the art to which the present invention relates, the present disclosure will suggest many modifications and constructions as well which may include alternative combinations of two or more of the individual features mentioned from the same or different drawings or as otherwise evident from the text and/or drawings and widely differing embodiments and applications without thereby departing from the spirit and scope of the invention.

It is claimed:

1. A recirculating pet water fountain comprising:
   a first water-holding basin defining a lower drinking bowl;
   a second water-holding basin defining an upper drinking bowl arranged at least partially above the lower drinking bowl of the first water-holding basin, the upper drinking bowl configured so that the water in the upper drinking bowl flows out of the upper drinking bowl and into the lower drinking bowl;
   an arm extending upwardly from the first water-holding basin to the second water-holding basin, the arm spacing the upper drinking bowl from and above the lower drinking bowl;
   a pump in fluid-flow communication with a generally upwardly extending fluid-conveying conduit, the pump delivering the water from the lower drinking bowl through the fluid-conveying conduit upwardly to the upper drinking bowl;
   a generally horizontally extending step disposed alongside the lower drinking bowl upon which an animal is able to at least partially support itself when drinking from either the lower drinking bowl or the upper drinking bowl;
   a water-conveying bridge that receives the water that flows out of the upper drinking bowl, the water-conveying bridge comprising an open water-transport channel that faces outwardly toward the step, the open water-transport channel comprising a generally concave water-conveying channel surface;
   an overflow tube extending upwardly out of the water in the lower drinking bowl, the overflow tube having a mouth disposed above the water in the lower drinking bowl in which water from the water-conveying bridge is received that overflows from the overflow tube into the lower drinking bowl; and
   wherein the mouth of the overflow tube is disposed adjacent the step.

2. The recirculating pet fountain of claim 1 wherein the fluid-conveying conduit is housed within the arm.

3. The recirculating pet fountain of claim 1 wherein the arm comprises a manually graspable handle.

4. The recirculating pet fountain of claim 1 wherein the fluid-conveying conduit is carried by the arm.

5. The recirculating pet fountain of claim 4 wherein the pump is disposed in the arm alongside the lower drinking bowl.

6. The recirculating pet fountain of claim 5 wherein the fluid-conveying conduit is housed within the arm.

7. The recirculating pet fountain of claim 5 wherein the lower drinking bowl has a sidewall with a perforate intake in fluid-flow communication with the pump and wherein the pump is disposed outwardly of the lower drinking bowl alongside the intake.

8. The recirculating pet fountain of claim 4 wherein the upper drinking bowl extends outwardly from the arm and is accessible by an animal at least partially supported by the step enabling the animal to drink from the upper drinking bowl.

9. The recirculating pet fountain of claim 1 wherein the step comprises a generally horizontally extending shelf spaced above a water line of the water in the lower drinking bowl enabling an animal at least partially supporting itself to drink from one of the lower drinking bowl and the upper drinking bowl.

10. The recirculating pet fountain of claim 1 wherein the arm is disposed on one side of the first water-holding basin and the step is disposed on an opposite side of the first water-holding basin.

11. The recirculating pet fountain of claim 10 wherein the overflow tube is disposed between the arm and the step.

12. The recirculating pet fountain of claim 1 wherein (a) the arm extends upwardly to one side of the second water-holding basin, and (b) the water-conveying bridge extends downwardly from an opposite side of the second water-holding basin toward the step.

13. The recirculating pet fountain of claim 1 wherein (a) the arm is (i) connected at one end the first water-holding basin, and (ii) connected at an opposite end to the second water-holding basin, and (b) the water-conveying bridge is (i) connected at one end to the second water-holding basin, and (ii) connected at an opposite end to the overflow tube.

14. The recirculating pet fountain of claim 1 wherein the water-conveying bridge is elongate and extends from the upper drinking bowl downwardly toward the step and into the overflow tube.

15. The recirculating pet fountain of claim 1 wherein an animal at least partially supported upon the step can drink the water flowing downwardly along the water-conveying bridge.

16. The recirculating pet fountain of claim 1 wherein the step is disposed on one side of the lower drinking bowl and the arm is disposed on a side of the drinking bowl opposite the step and wherein the pump is disposed on the side of the drinking bowl opposite the step.

17. The recirculating pet fountain of claim 1 wherein the overflow tube is configured to receive the water flowing out of the upper drinking bowl before overflowing from the overflow into the lower drinking bowl, and the overflow disposed inline with the step and the upper drinking bowl.

18. A recirculating pet fountain comprising:
a lower drinking bowl having an overflow tube extending upwardly out of water received in the lower drinking bowl, the overflow tube having a mouth disposed above the water in the lower drinking bowl in which water is received that overflows from the overflow tube into the lower drinking bowl;
an upper drinking bowl that overlies at least a portion of the lower drinking bowl;
a pump in water-flow communication with water in the lower drinking bowl that pumps water from the lower drinking bowl upwardly to the upper drinking bowl;
a generally upwardly extending arm spacing the upper drinking bowl from the lower drinking bowl; and
a water-conveying bridge that conveys water flowing out of the upper drinking bowl downwardly into the mouth of the overflow tube which overflows therefrom into the lower drinking bowl, the water-conveying bridge comprising an open water-transport channel configured to enable a pet to drink water therefrom as water is being conveyed thereby from the upper drinking bowl into the overflow tube.

19. The recirculating pet fountain of claim 18 wherein the lower drinking bowl further comprises an animal-supporting step extending alongside one side thereof, and wherein the arm extends from an opposite side of the lower drinking bowl upwardly toward the upper drinking bowl.

20. The recirculating pet fountain of claim 19 wherein the water-conveying bridge extends outwardly and downwardly from the upper drinking bowl toward the step and the open water-transport channel faces outwardly toward the animal-supporting step.

21. The recirculating pet fountain of claim 19 wherein the pump is disposed on the side of the lower drinking bowl opposite the animal-supporting step.

22. The recirculating pet fountain of claim 18 wherein the lower drinking bowl further comprises an animal-supporting step disposed on one side of the lower drinking bowl, and wherein the pump is disposed on a side of the lower drinking bowl opposite the animal-supporting step.

23. The recirculating pet fountain of claim 22 wherein the upwardly extending arm is disposed on the side of the lower drinking bowl opposite the animal-supporting step.

24. The recirculating pet fountain of claim 18 wherein the lower drinking bowl further comprises an animal-supporting step extending generally horizontally outwardly therefrom, the step disposed alongside the mouth of the overflow tube and adjacent the open water-transport channel of the water-conveying bridge enabling an animal at least partially supported by the step to drink water from any one of the lower drinking bowl, the upper drinking bowl, and the water-conveying bridge.

25. The recirculating pet fountain of claim 18 wherein water from the lower drinking bowl is pumped by the pump upwardly through the arm to the upper drinking bowl.

26. The recirculating pet fountain of claim 25 further comprising an elongate water-conveying conduit extending upwardly in the arm from the pump to the upper drinking bowl through which water from the lower drinking bowl is pumped upwardly to the upper drinking bowl.

27. The recirculating pet fountain of claim 26 wherein the pump is disposed inside the arm.

28. The recirculating pet fountain of claim 27 wherein the water-conveying conduit is disposed inside the arm.

* * * * *